US006826403B1

(12) United States Patent
Minborg et al.

(10) Patent No.: US 6,826,403 B1
(45) Date of Patent: Nov. 30, 2004

(54) METHOD AND SYSTEM FOR IDENTIFYING A USER

(75) Inventors: Per-Åke Minborg, Stora Hoga (SE); Timo Pohjanvuori, Gothenburg (SE)

(73) Assignee: PhonePages of Sweden AB, Gothenburg (SE)

(*) Notice: Subject to any disclaimer, the term of this patent is extended or adjusted under 35 U.S.C. 154(b) by 569 days.

(21) Appl. No.: 09/660,400

(22) Filed: Sep. 12, 2000

(51) Int. Cl.[7] .............................................. H04Q 7/20
(52) U.S. Cl. ....................................... 455/445; 380/249
(58) Field of Search ............................. 455/445, 414, 455/416, 518, 519, 520, 433, 435, 415, 417, 422, 432, 434, 436, 438, 439, 440; 380/249, 250, 270, 271; 282/44; 709/219; 370/338, 395.3, 392, 328, 351

(56) References Cited

U.S. PATENT DOCUMENTS

| | | |
|---|---|---|
| 5,398,279 A | 3/1995 | Frain |
| 5,613,205 A | 3/1997 | Dufour |
| 5,633,922 A | 5/1997 | August et al. |
| 5,712,979 A | 1/1998 | Graber et al. |
| 5,761,279 A | 6/1998 | Bierman et al. |
| 5,812,950 A | 9/1998 | Tom |
| 5,850,433 A | 12/1998 | Rondeau |
| 5,878,347 A | 3/1999 | Joensuu et al. |
| 5,895,471 A | 4/1999 | King et al. |
| 5,901,352 A | 5/1999 | St-Pierre et al. |
| 5,930,703 A | 7/1999 | Cairns |
| 5,940,598 A | 8/1999 | Strauss et al. |
| 5,946,684 A | 8/1999 | Lund |
| 5,948,066 A | 9/1999 | Whalen et al. |
| 5,950,137 A | 9/1999 | Kim |
| 5,952,969 A | 9/1999 | Hagerman et al. |
| 5,963,626 A | 10/1999 | Nabkel |
| 5,970,414 A | 10/1999 | Bi et al. |

(List continued on next page.)

FOREIGN PATENT DOCUMENTS

| | | |
|---|---|---|
| DE | 19737126 | 3/1999 |
| EP | 0851647 | 7/1998 |

(List continued on next page.)

OTHER PUBLICATIONS

PCT–International Search Report for PCT/SE01/00071.
PCT–International Search Report for PCT/SE01/00080.

(List continued on next page.)

*Primary Examiner*—Charles Appiah
*Assistant Examiner*—Naghmeh Mehrpour
(74) *Attorney, Agent, or Firm*—Hunton & Williams LLP

(57) ABSTRACT

A data server derives information regarding the identities of users placing calls in a circuit-switched communication network. It performs this task by initially establishing at least one known and trusted identity "seed." The data server uses the trusted identity seed, in conjunction with information regarding calls placed in the circuit-switched communication network, to derive additional user identities. Further, a user device may encrypt its secret identification number before transmitting it to the data server to maintain the secrecy of this information. The data server is additionally configured to modify previously derived identities when the server determines that they have become inaccurate.

31 Claims, 16 Drawing Sheets

U.S. PATENT DOCUMENTS

| | | | |
|---|---|---|---|
| 6,002,749 A | 12/1999 | Hansen et al. | |
| 6,005,870 A | 12/1999 | Leung et al. | |
| 6,006,097 A | 12/1999 | Hörnfeldt et al. | |
| 6,009,091 A | 12/1999 | Stewart et al. | |
| 6,014,090 A | 1/2000 | Rosen et al. | |
| 6,031,836 A | 2/2000 | Haserodt | |
| 6,049,713 A | 4/2000 | Tran et al. | |
| 6,058,310 A | 5/2000 | Tokuyoshi | |
| 6,064,887 A * | 5/2000 | Kallioniemi et al. | 455/445 |
| 6,067,546 A | 5/2000 | Lund | |
| 6,075,993 A | 6/2000 | Kawamoto | |
| 6,088,587 A | 7/2000 | Abbadessa | |
| 6,088,598 A | 7/2000 | Marsolais | |
| 6,091,808 A | 7/2000 | Wood et al. | |
| 6,094,168 A | 7/2000 | Duffett-Smith et al. | |
| 6,097,793 A | 8/2000 | Jändel | |
| 6,097,942 A * | 8/2000 | Laiho | 455/414 |
| 6,115,754 A | 9/2000 | Landgren | |
| 6,134,450 A | 10/2000 | Nordeman | |
| 6,138,158 A | 10/2000 | Boyle et al. | |
| 6,141,413 A | 10/2000 | Waldner et al. | |
| 6,154,646 A | 11/2000 | Tran et al. | |
| 6,157,841 A | 12/2000 | Bolduc et al. | |
| 6,161,008 A | 12/2000 | Lee et al. | |
| 6,163,598 A | 12/2000 | Moore | |
| 6,169,897 B1 | 1/2001 | Kariya | |
| 6,173,316 B1 | 1/2001 | De Boor et al. | |
| 6,181,928 B1 | 1/2001 | Moon | |
| 6,181,935 B1 | 1/2001 | Gossman et al. | |
| 6,185,184 B1 | 2/2001 | Mattaway et al. | |
| 6,192,251 B1 | 2/2001 | Jyogataki et al. | |
| 6,192,258 B1 | 2/2001 | Kamada et al. | |
| 6,199,099 B1 | 3/2001 | Gershman et al. | |
| 6,202,023 B1 | 3/2001 | Hancock et al. | |
| 6,205,204 B1 | 3/2001 | Morganstein et al. | |
| 6,208,659 B1 | 3/2001 | Govindarajan et al. | |
| 6,215,790 B1 | 4/2001 | Voit et al. | |
| 6,219,694 B1 | 4/2001 | Lazaridis et al. | |
| 6,219,696 B1 | 4/2001 | Wynblatt et al. | |
| 6,226,367 B1 | 5/2001 | Smith et al. | |
| 6,226,668 B1 | 5/2001 | Silverman | |
| 6,233,608 B1 | 5/2001 | Laursen et al. | |
| 6,301,609 B1 | 10/2001 | Aravamudan et al. | |
| 6,356,956 B1 | 3/2002 | Deo et al. | |
| 6,469,998 B1 * | 10/2002 | Salinas et al. | 370/338 |
| 2002/0128002 A1 * | 9/2002 | Vu | 455/419 |

FOREIGN PATENT DOCUMENTS

| | | |
|---|---|---|
| EP | 0 853 287 A2 | 7/1998 |
| EP | 0858202 | 8/1998 |
| EP | 0869688 | 10/1998 |
| EP | 0 869 688 A2 | 10/1998 |
| EP | 0944203 | 9/1999 |
| EP | 1069789 | 1/2001 |
| EP | 1089519 | 4/2001 |
| GB | 2338150 | 12/1999 |
| WO | 94/23523 | 10/1994 |
| WO | WO 97/07644 | 2/1997 |
| WO | WO 97/13380 | 4/1997 |
| WO | WO 97/22211 | 6/1997 |
| WO | WO 97/22212 | 6/1997 |
| WO | 97/31490 | 8/1997 |
| WO | 97/31491 | 8/1997 |
| WO | WO 97/31491 | 8/1997 |
| WO | 98/11744 | 3/1998 |
| WO | 98/18283 | 4/1998 |
| WO | 98/19445 | 5/1998 |
| WO | WO 98/51056 A2 | 11/1998 |
| WO | WO 98/56159 A1 | 12/1998 |
| WO | 98/56197 | 12/1998 |
| WO | 99/00751 | 1/1999 |
| WO | 99/35595 | 7/1999 |
| WO | WO 99/55107 | 10/1999 |
| WO | WO 00/38458 | 6/2000 |
| WO | 00/39666 | 7/2000 |
| WO | 00/46697 | 8/2000 |
| WO | 00/78016 | 12/2000 |
| WO | 01/01077 | 1/2001 |
| WO | 01/20475 | 3/2001 |

OTHER PUBLICATIONS

ETSI TS 101 267 (V.8.5.0) Technical Specification for Digital telecommunications system (Phase 2+); Specification of the SIM Application Toolkit for the Subscriber Identity Module—Mobile Equipment (SIM–ME) interface) (Global System for Mobile Communications: 1999).

PCT–International Search Report for PCT/SE01/01939, filed Sep. 11, 2001.

Smart Messaging Specification, Revision 2.0.0, Nokia Mobile Phones Ltd., May 17, 1999.

Digital Cellular Telecommunications System (Phase 2); Technical Realization of the Short Message Service (SMS) Point–to–Point (GSM 03.40), ETSI, ETS 300 536, Fourth Edition, Oct. 1996.

Commonly Assigned U.S. patent application Ser. No. 09/644,307, entitled "Method and Apparatus for Exchange of Information in a Communication System," filed Aug. 23, 2000 (and currently copending herewith).

Schulzrinne, "A Comprehensive Multimedia Control Architecture for the Internet," Dept. of Computer Science, Columbia University, New York, NY, IEEE No. 0–7803–3799–9/97, 1997, pp. 65–76.

Schulzrinne and Rosenberg, "Signaling for Internet Telephony," Columbia University and Bell Laboratories, respectively, ten pages.

Dalgic et al., "True Number Portability and Advanced Call Screening in a SIP–Based IP Telephony System," IEEE Communications Magazine, Jul. 1999, pp. 96–101.

* cited by examiner

METHOD AND SYSTEM FOR IDENTIFYING A USER

BACKGROUND OF THE INVENTION

The present invention relates to a method and system for determining the identity of a system user. More specifically, the present invention pertains to a method and system for deriving the identity of a subscriber of a communications system for use in providing services to the subscriber.

The communications industry currently provides consumers with a wide array of new and/or enhanced communications technologies. The Global System for Mobile Communications (GSM), for instance, provides traditional circuit-switched communication to its subscribers. Circuit-switched systems allocate a fixed resource to a subscriber when making a call. The resource remains allocated even during idle periods in which the subscriber is transmitting no data. In contrast, the more recently developed General Packet Radio Service (GPRS) system provides packet-switched communication to its subscribers. Packet-based systems utilize communication resources only when information is being transmitted over the network. Further background details on GSM-compatible technology can be found in Lawrence Harte et al., GSM Superphones, McGraw-Hill, 1999. Further background details on the GPRS standard may be found in Christian Bettstetter et al., "GSM Phase 2+General Packet Radio Service GPRS: Architecture, Protocols, and Air Interface," IEEE Communications Surveys, <<http:// www.comsoc.org/pubs/surveys>>, Third Quarter 1999, Vol. 2, No. 2.

In addition, the Internet (which uses packet data protocol) and other data communication networks (e.g., Intranets) now provide a wide variety of services to consumers. Most consumers continue to interface with the Internet using personal computers. More specifically, a user typically interfaces with these networks by dialing a modem pool to connect to a server. From there, the user has access to both local and global data networks. Browsers, such as Microsoft Explorer™ and Netscape Navigator™, allow the user to navigate on the Internet and switch between Internet pages or addresses.

Some efforts have been made in recent years to provide means for interfacing between different communication technologies and/or services. However, different communication services have generally evolved along independent paths, without giving adequate consideration to compatibility issues. It has therefore often proven challenging to provide an effective interface between these systems or to share information between these systems. For instance, service providers and communications operators are typically hesitant to release information concerning their subscribers' identities to other, non-affiliated, service providers.

For example, a GSM telephone forwards a GSM internal identification number to the communication system when it makes a call. This number is referred to as the Internal Mobile Subscriber Identity (IMSI) number. The communications system associates this number with the subscriber's public telephone number. This public number is formally referred to as the Mobile Subscriber Integrated Service Digital Network number (MSISDN). This protocol has a number of drawbacks. For instance, other service providers do not have access to the mappings between the secret and public identification numbers. This makes it difficult for these other service providers to provide supplemental services to the subscribers during the use of their communication devices.

One solution to the above problem would be to simply disclose the mappings of public and secret identities to all interested parties. However, in today's information age, many subscribers and operators are reluctant to divulge personal information over the Internet (and other public networks). There remains a general concern regarding invasion of privacy issues, and specific concerns regarding credit fraud and related issues. Accordingly, the above-identified solution may not be fully satisfactory.

There is therefore a need to provide more effective techniques for interfacing between different communication technologies, and in particular for conveying subscriber identity information between different communication technologies.

SUMMARY OF THE INVENTION

The technique disclosed herein addresses the above-identified problems. In accordance with one embodiment of the technique, a data server derives information regarding the identities of users placing calls in a circuit-switched communications network. It performs this task by initially establishing at least one known and trusted identity "seed." This trusted identity is stored in a "known list." The data server then uses the trusted identity seed, in conjunction with information regarding calls placed in the circuit-switched communication network, to derive additional user identities. The data server stores the derived identities in the known list. The derived user identities also serve as new "seeds" for uncovering additional user identities. In this fashion, the data server may quickly supply the identities of unknown users without having access to the internal databases maintained by the circuit switched communication system.

In one particular embodiment, the identities are defined by a pairing of secret and public identities used by the circuit-switched communications network to identify its subscribers (e.g., IMSI and MSISDN identification numbers, respectively).

Further, a user device may encrypt its secret identification number before transmitting it to the data server to maintain the secrecy of this information.

Further, the data server can additionally verify that the user identities stored in the known list remain valid. The data server can be configured to invalidate or correct inaccurate entries.

BRIEF DESCRIPTION OF THE DRAWINGS

The present invention can be understood more completely by reading the following Detailed Description of exemplary embodiments, in conjunction with the accompanying drawings, in which.

DETAILED DESCRIPTION OF THE INVENTION

1. System Architecture

The identity mapping technique is described with reference to specific types of communication systems, standards and protocols to facilitate explanation. However, the technique can be implemented using other types of systems, including various types of circuit and packet-switched systems. The technique likewise can be implemented with reference to any type of fixed or mobile terminals using any type of access technology, such as Time Division Multiple Access (TDMA), Code Division Multiple Access (CDMA), Frequency Division Multiple Access (FDMA), Orthogonal Frequency Division Multiple Access (OFDMA), Time Division Duplex (TDD), Frequency Division Duplex (FDD), etc., or any combinations thereof.

Figure 1:
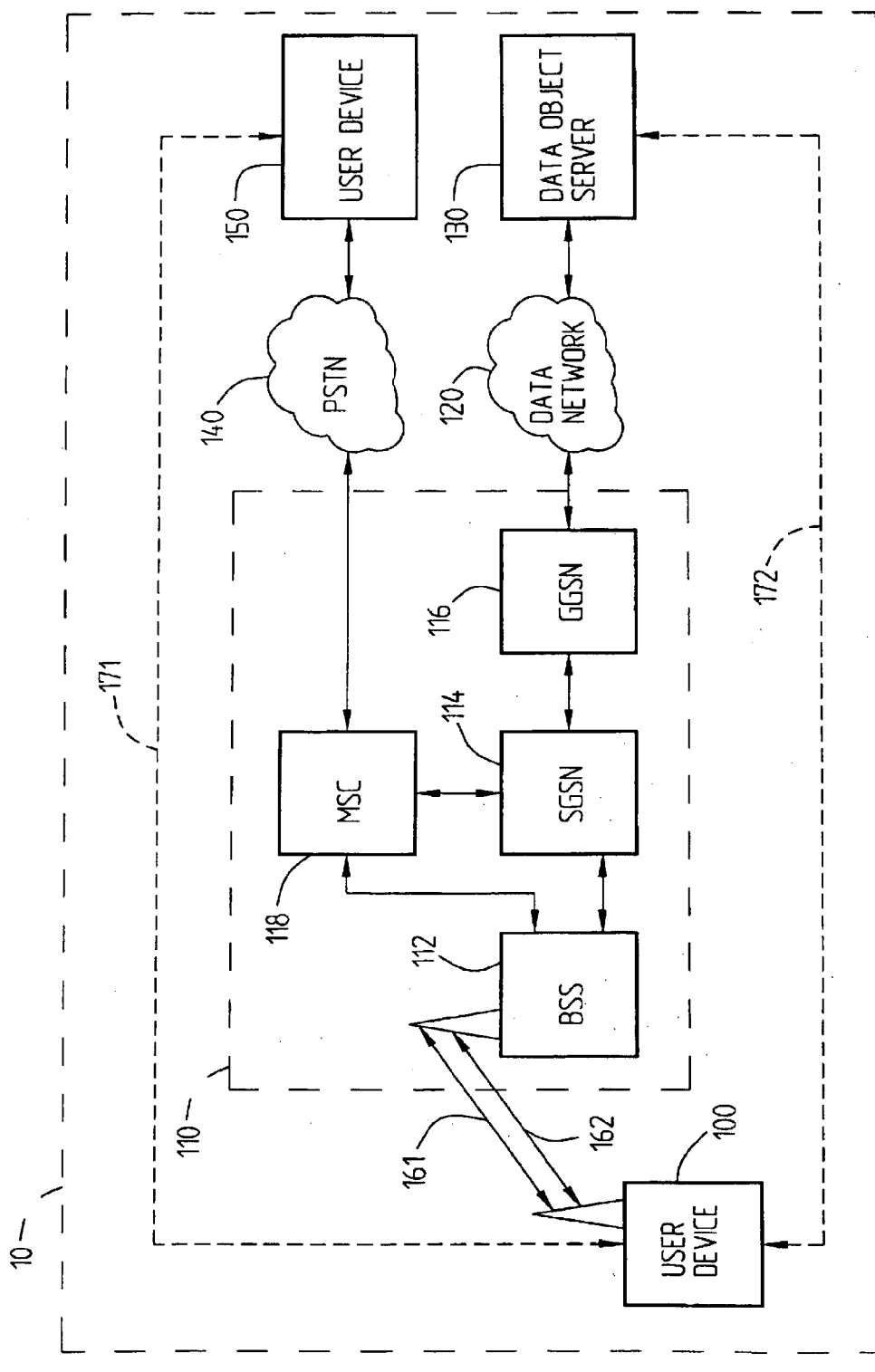
FIG. 1 shows an exemplary system for implementing the techniques described herein.

FIG. 1 illustrates an overview of a system 10 that can implement the technique. The system 10 combines multiple different network infrastructures 110 for providing communication resources to a user device 100. More specifically, the system 10 includes a circuit-switched (CS) network and a packet-switched (PS) network. The circuit-switched part of the network may be implemented according to the GSM standard. It includes a Mobile Switching Center (MSC) 118 and a Base Station Subsystem (BSS) 112, which are well known to those skilled in the art. The circuit-switched part of the communication network interfaces with the Public Switched Communication Network (PSTN) 140. The PSTN can provide connection between a user device 100 and user device 150.

The packet-switched part of the network may be implemented using the GPRS standard. It include a Serving GPRS Support Node (SGSN) 114 and a Gateway GPRS Support Node (GGSN) 116. The BSS 112 also provides communication resources to the packet-switched part of the system. Namely, the BSS 112 provides both packet-switched communication resources (denoted by communication 162) and circuit-switched communication resources (denoted by communication 161). As shown, the packet-switched and circuit-switched parts of the network may also be interconnected by way of an interface between the MSC 118 and the SGSN 114.

The packet-switched part of the network interfaces with a data network 120. The data network can comprise any type of data network having limited or global access, such as an Intranet, the Internet, Local Area Network (LAN), etc. Also, the data network 120 typically includes one or more routers (not illustrated) and data bridges to interconnect nodes in the network and to enable the nodes to communicate with each other. The data network provides connection between the user terminal 100 and one or more data server objects 130.

Accordingly, a party using user device 100 (referred to as the A-party) may obtain a complete logical connection 171 to a user using user device 150 (referred to as the B-party). This channel is formed by the BSS circuit-switched resources 161 of BSS 112, MSC node 118, and PSTN 140. For example, this channel can be used to conduct real-time voice communication between user device 100 and user device 150. Similarly, a party using user device 100 may obtain a complete logical connection 172 to data server 130 connected to the data network 120. This channel is formed by the BSS packet-switched resources 162 of BSS 112, the SGSN 114, GGSN 116 node, and data network 120. This channel can be used to transmit data between the user device 100 and the data server 130.

In a variation of the present invention, the user device 100 does not support the use of a packet-switched communication channel. In this alternative embodiment (not shown), data objects from the server 130 (or some other network equipment) can be retrieved by other means, such as a Short Message Service (SMS) or a temporary CS communication channel.

In another variation, a packet-switched communication channel having a particular QoS is used for conveying speech within the communication system 10, and the PSTN 140 and the data network 120 are interconnected by some alternative known means (not shown in FIG. 1).

Having described the overall architecture of the system 10, further description of its structural components follows. Well known structure and protocol is not discussed so as to facilitate explanation.

The SGSN 114 typically includes functionality for the delivery of data packets from and to the user devices within its service area. It also performs packet routing and transfer, authentication and charging operations, mobility management, and logical link management.

The GGSN 116 acts as an interface between the GPRS system and external packet data networks. More specifically, this node converts the GPRS packets sent from the SGSN into the packet data protocol (PDP) format appropriate for the external network (e.g., Internet Protocol or X.25). It also transmits the converted packets to the packet data network. This node also converts PDP addresses of incoming data packets into the GSM address of destination user devices.

Figure 2:
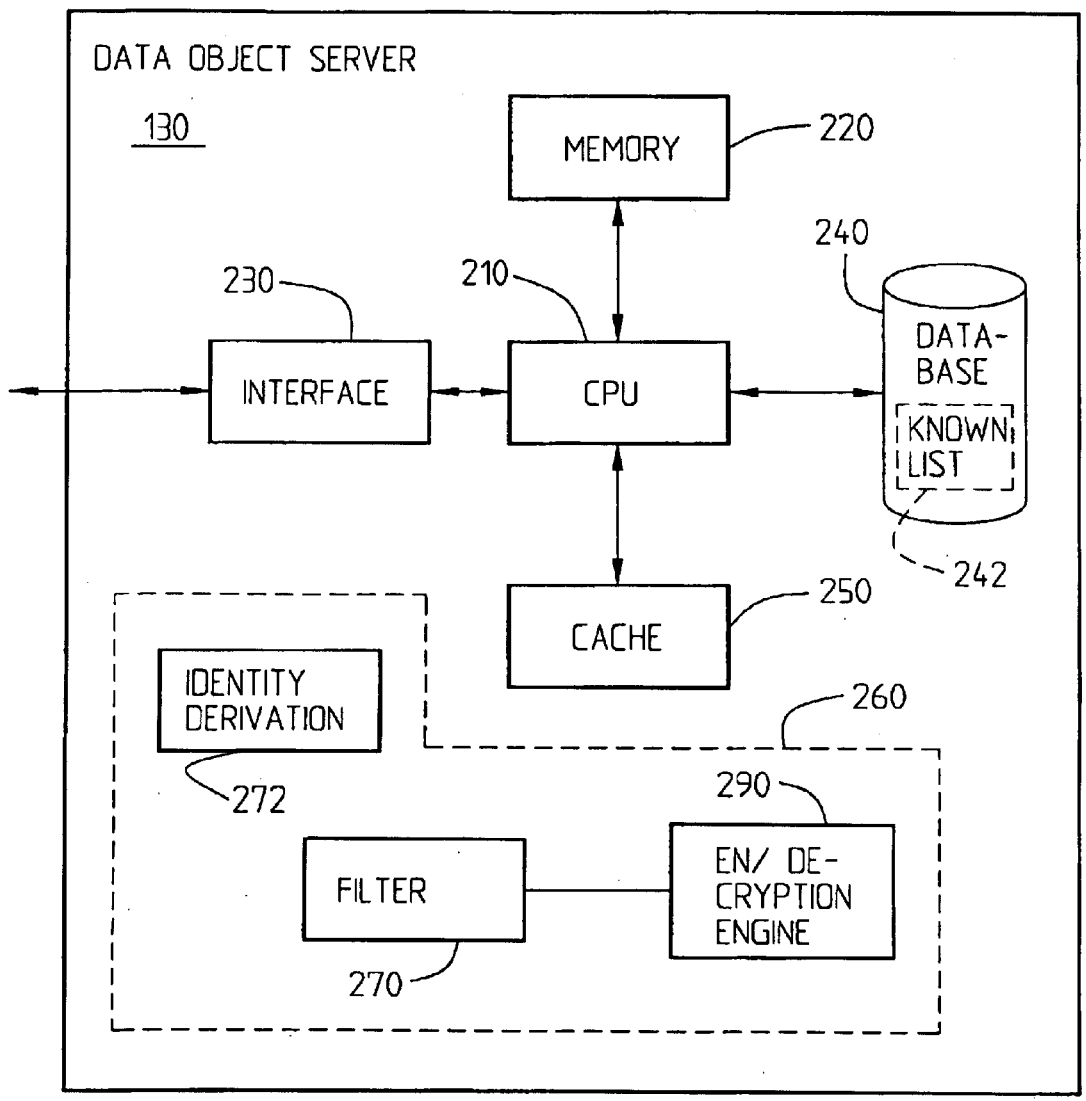
FIG. 2 shows an exemplary server for use in the system of FIG. 1.

The data network 120 provides access to one or more data object servers 130 (only one is shown to simplify the discussion). FIG. 2 identifies features of the data server 130. It includes at least one CPU 210 connected to at least one memory device 220, a cache memory 250, at least one database 240, and at least one communication interface 230. Memory devices 220 and databases 240 can be non-volatile. The interface 230 enables the CPU 210 to send and receive data to/from the data network 120. The cache memory 250 allows storage of frequently used data objects so that the CPU 210 may obtain them in an efficient manner. The database 240 contains the actual data objects that can be requested by the user device 100 via the communication infrastructure 110 and the data network 120. The data object server 120 may also comprise a number of programs 260. The programs 260 can include a filter 270 allowing the data objects to be optimized according to the rendering capabilities of the user device 100. The programs 260 may also include an encryption/decryption engine 280 allowing data object requests to be decrypted and data objects to be encrypted.

According to a variation, various modules of the data server can be implemented as separate computers. The computers may be located together in one facility or located remotely from each other.

The database 240, including the known list 242, can comprise any type of storage media. For instance, it can comprise a hard-drive, RAM memory, magnetic media (e.g., discs, tape), optical media, printed media (e.g., lists), etc. The database 240 can be formed using any type of organization, such as relational, object-oriented, etc. The database 240 can be separated into two or more databases in a distributed fashion. Further, the database (or databases) 240 may contain redundant data. Any node can access the database (or databases) 240, including internal nodes (e.g., nodes internal to the data server system) or external nodes (e.g., nodes external to the data server system). The list 242 may be stored in the same physical storage media as the data objects (e.g., the phonepages), or in a separate database. Thus, the database 240 is intended to very generally represent any type of means of retaining data objects and subscriber identification information.

According to one aspect of the technique, the data objects stored in database 240 include graphical information objects associated with telephone numbers. These pages are alternatively referred to as "phonepages." That is, for instance, selected phonepages might correspond to the telephone numbers of the subscribers of user device 100 and user device 150. The telephone number associated with user device 100 is referred to as an A-number pertaining to an A-party. The telephone number associated with user device 150 is referred to as a B-number pertaining to a B-party.

The system can be configured in such a manner that the A-party, upon dialing the B-number, connects to a data object server 130 (by way of the packet-switched communication channel) and receives a data object, e.g., a "phonepage" stored in a memory position in the data object server, with a memory address corresponding to the B-number dialed. The phonepage may, for example, comprise information about the B-party, such as phone number, address and other information. Alternatively, the phonepage may simply provide an immediate access to an internal or external data network as maintained by the B-party subscriber. After having received the B-party phonepage, the system can execute one or more procedures. For instance, if the B-number is addressing a POT (Plain Old Telephone) 150, a circuit-switched voice connection can be set up. If the B-number is addressing another device, other events may occur. The procedures performed may also depend on the type of A-party device 100 being used.

The database 240 also stores a list 242 of known associations between secret and public identification numbers of the communications system subscribers. That is, if the data server 130 successfully determines the association (or mapping) between a secret and public identification number for a subscriber, it stores this association in the list 242. In the exemplary GSM environment, the secret identification number would correspond to the Internal Mobile Subscriber Identity (IMSI) number. This is an internal (non-public) number used for internal call routing, billing, etc. The public identification number corresponds to the Mobile Subscriber Integrated Service Digital Network (MSISDN) number. This number is generally the same as the number that a third party enters to reach a subscriber.

The programs 260 also include an identity derivation module 272. This module 272 is used to derive the identities of communication system subscribers on the basis of information stored in the known list 242 of the database 240. Further details regarding this function are discussed in section No. 3 below.

Figure 3:
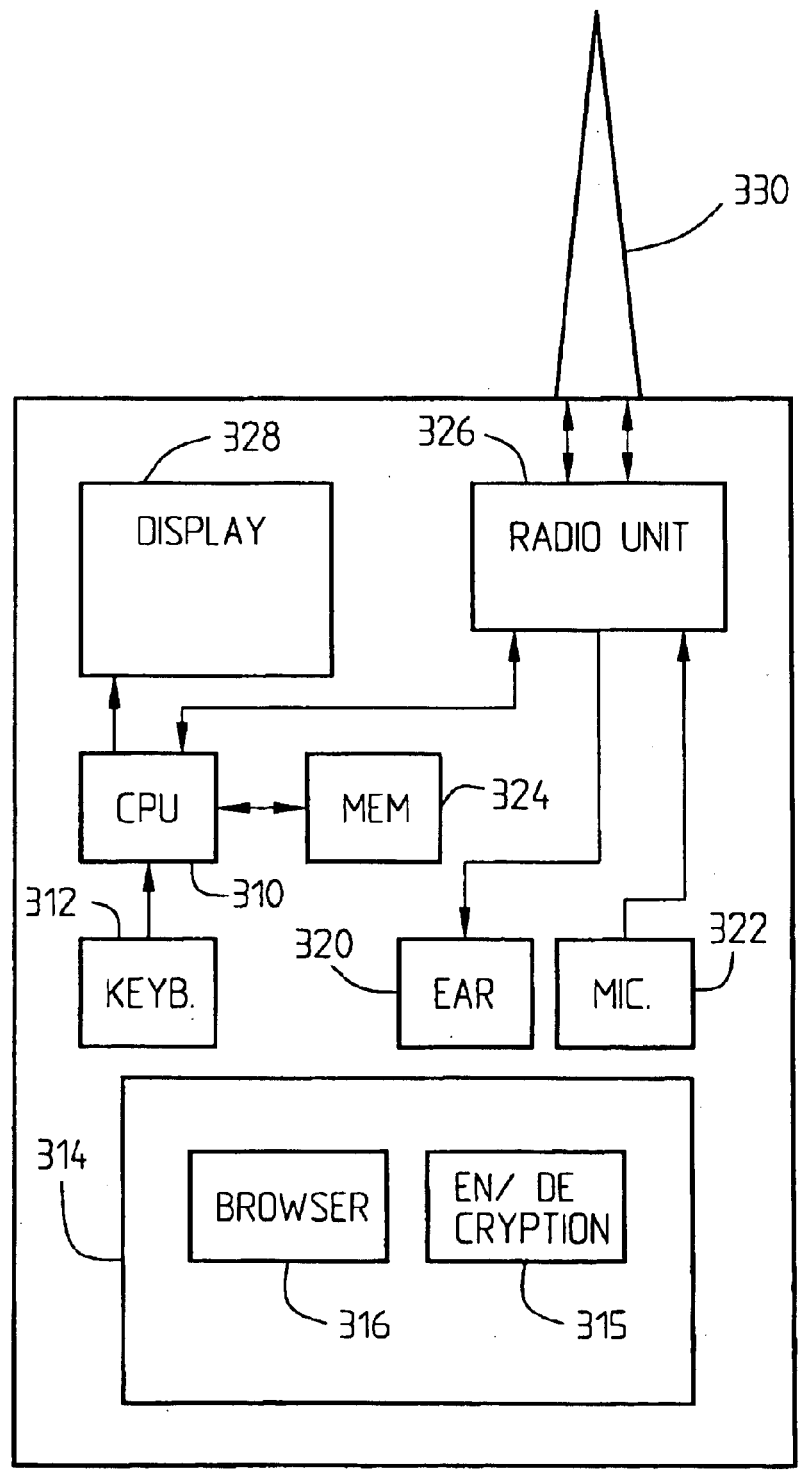
FIGS. 3-5 show different types of terminals that can interact with the system of FIG. 1.
Figure 4:
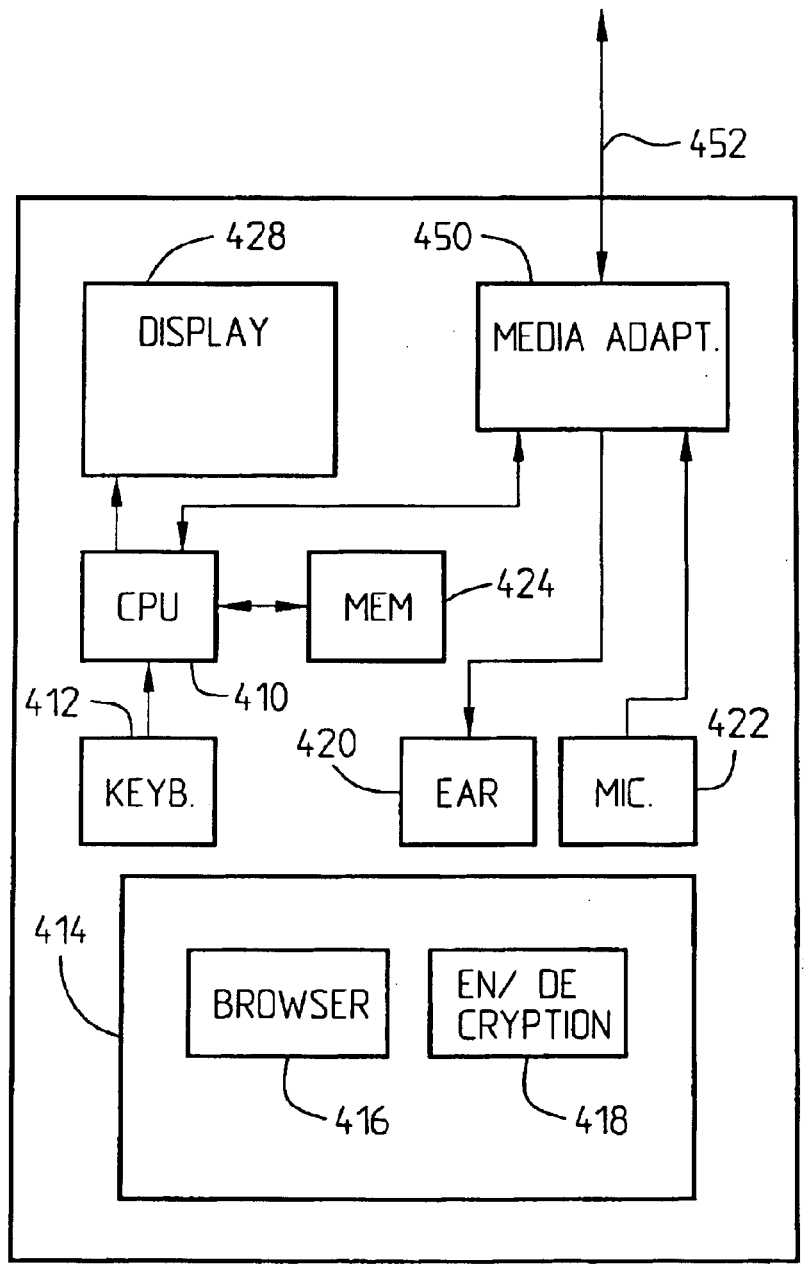
Figure 5:
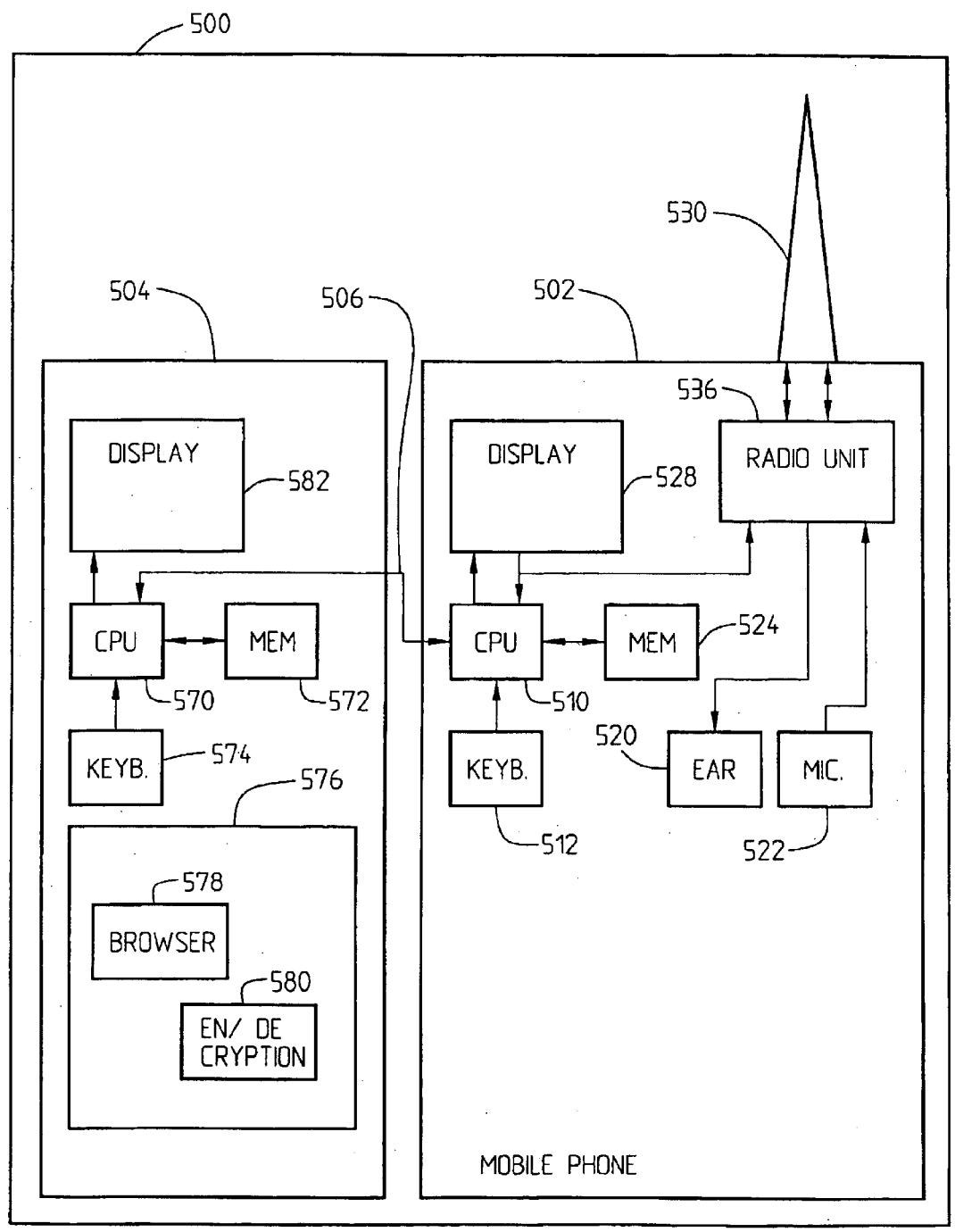

FIGS. 3-5 show different types of user devices 100 that can interface with the network infrastructure 110. For instance, the user device 100 shown in FIG. 3 comprises a mobile telephone or a PDA with mobile telephone capabilities. The mobile telephone includes a central processing unit (hereafter CPU) 310 connected to at least one memory unit 324, and at least one display 328. The CPU 310 may also be connected to a keyboard device 312 or other type of input device. The memory unit 325 may be non-volatile (e.g., EEPROM or SIM card) in order to retain stored information, should power be temporarily unavailable. The CPU 310 is further connected to a radio unit 326 that can convert incoming and out going data to RF modulated signals in well-known fashion. The radio unit 326 also connects to an antenna 330 allowing the RF modulated signals to be received/transmitted from/to an RF compatible media (e.g., air). The radio unit 326 may also directly or indirectly be connected to an earphone 320 and a microphone 322 to enable voice communication.

The user device may further comprise a plurality of programs 314, such as a browser 316. The browser 316 presents at least one type of data object to a user for viewing. The programs 314 may also include an encryption/decryption engine 318 that encrypts data object requests and decrypts received data objects. The user device may optionally include cache memory (not shown) for storing and retrieving frequently used display objects, etc.

FIG. 4 illustrates another type of user device 100 that can be used to interface with network infrastructure 110. The device shown there is a fixed (non-mobile) telephone with graphic capabilities. According to this second variant, the user device includes the same basic components discussed above in connection with FIG. 3, including CPU 410, keyboard 412, memory 424, earphone 420, microphone 422, display 428, and programs 414. The programs include browser 416 and encryption/decryption engine 418. The user device 100 in FIG. 4 differs by replacing the radio unit 326 with a media adapter 450, and by replacing the antenna 330 with a hardwired connection 452. The media adapter 450 converts incoming and outgoing signals to and from a particular,media standard, including but not limited to ISDN, ADSL, HDSL, VDSL, various cable network-compatible formats, etc.

FIG. 5 shows yet another type of user device 100 that can interface with the communication infrastructure 110. The user device shown there comprises a mobile telephone 502 that may lack data object rendering capabilities. The mobile telephone 502 interfaces with a Personal Digital Assistance Device (PDA) device 504 (or similar device) via a communication link 506. The communication link 506 may comprise, for example, an infrared, radio (e.g., Bluetooth™) or wire communication arrangement. The PDA 504 includes functionality for displaying and manipulating the data objects.

More specifically, the mobile telephone 502 in FIG. 5 generally includes many of the same basic components discussed above in connection with FIG. 3, including CPU 510, keyboard 512, memory 524, earphone 520, microphone 522, display 528, radio unit 536 and antenna 530. The mobile telephone 502, however, may lack the programs 314 shown in FIG. 3.

The PDA 504 shown in FIG. 5 includes a CPU 570 connected to at least one memory unit 572, and at least one display 582. The CPU 570 may also be connected to a keyboard device 574 or other known type of input device (to allow, for instance, a user to enter digits.) The memory unit 572 may be non-volatile (e.g., EEPROM or SIM card) in order to retain stored information, should power be temporarily unavailable. The PDA 504 further comprises a collection of programs 576 including but not limited to a browser 578 that can present at least one type of data object to the user. The programs 576 also may include an encryption/decryption engine 580 allowing data object requests to be encrypted and data objects to be decrypted.

Returning to FIG. 1, the PSTN 140 provides access to another user device 150 over the fixed network. The user device 150 can also comprise any type of communication device, such as a "plain old telephone" (POT), facsimile or data modem devices, etc. The PSTN 140 can also interface (directly or indirectly) with a host of other types of devices or systems, such ISDN terminals and communication devices connected via a Digital Subscriber line (DSL).

Also, the PSTN can interface with another wireless system (e.g., having at least one MSC connected to at least one BSS) to provide wireless connection to a mobile telephone or like device. In this case, user device 150 may comprise a mobile telephone having any of the features discussed above in connection with FIGS. 3-5, or some other type of mobile device.

2. System Operation

Having described the exemplary architecture of the system 10, its operation will now be discussed.

Figure 6:
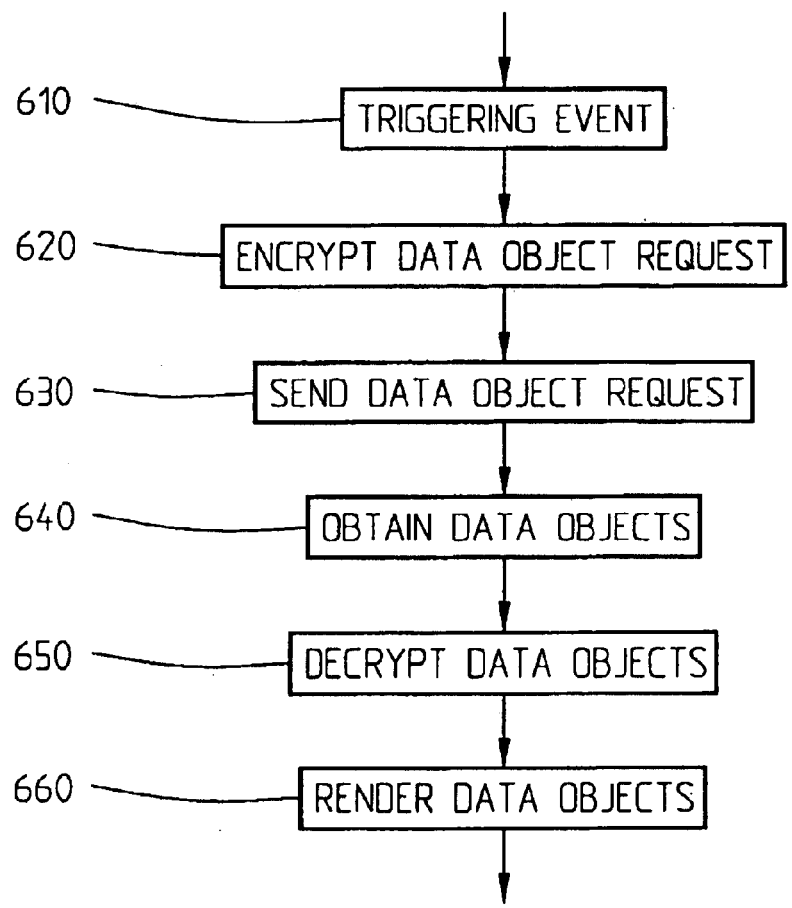
FIG. 6 shows a procedure for requesting and displaying data objects.

FIG. 6 is a flow diagram of a procedure used by the user device 100 for communicating a phonepage to an A-party. The procedure starts by an initiation from the A-party, (e.g., a user device 100 is switched on). Step 610 indicates the occurrence of some triggering event that causes the generation of a phonepage request. The trigger may be attributed to an automatic event (e.g., as when a call is terminated by the other party), or may be attributed to a manual event (e.g., as when the A-party dials a number, such as the B-number). More specifically, the triggering event may be at least one of the following incidents: a) an outgoing call is (or is about to be) initiated.; b) an addressed B-party answers a call; c) an addressed B-party is busy; d) an addressed B-party does not answer; e) an addressed B-party rejects a call; f) an addressed B-party is unavailable (e.g., an addressed mobile phone is out of coverage); g) an incoming call is imminent or has just started; h) a conference call is or is about to be initiated; i) a call is disconnected; j) a call is conducted (under which several triggering events can be generated); k) a subscriber is put on hold; l) a new cell in the PLMN has been selected; m) the location of a subscriber has changed; n) a new Public Land Mobile Network (PLMN) operator is selected; o) a new country of registration is made; p) a user device is about to be switched off, q) a user device has been switched on; r) a designated button on a user device is pressed; s) a talk spurt is received by a user device; t) a voice mail has been left to a subscriber; and u) an SMS has been sent to a subscriber.

The A-party initiates a request in step 630, possibly after encryption in step 620, and sends this request via a communication channel (e.g., a packet-switched channel as illustrated in FIG. 1) to a data object server. The data object request may include at least one of the following parameters: a) a requested protocol to be used for transmission (e.g., WAP, WML, HDML, HTML, XML, etc.); b) an identification of a data object server (e.g., a server name or a plain IP address); c) a code denoting what kind of event triggered the data object request (e.g., outgoing call setup); d) the indicated B-number associated with at least one B-party equipment; e) an A-party identity and/or a secret A-party identity (e.g., an A-number of a mobile station); f) a network address of the A-party (e.g., IP address) used by the data object server when returning a requested data object; g) a capability code indicating the displaying capabilities of the A-party (e.g., screen resolution, audio, etc.); h) a code indicating an encryption scheme or encryption key used; i) a code indicating the country that the mobile station is registered in (i.e., country code); j) a code identifying the current PLMN (V-PLMN) operator or the PLMN where the A-party has a subscription (HPLMN) or both; k) a code indicating the vendor of the mobile station and the type of the mobile station.; l) a code indicating a unique equipment identity; and m) a validation code (e.g., a checksum) of the parameters.

The data object request in step 630 may be answered by the data object server in an encrypted format. In this case, the user device 100 decrypts the object in decryption step 650 following the reception of the object at the user device 100 (in step 640). The user device 100 renders the data objects in step 660 in accordance with the capabilities of the user device 100.

Following step 660, a number of additional procedures may be performed which depend on the capabilities of the A-party user device 100 and/or the type of equipment addressed by the B-number. For example, a call may be set up or a call may be disconnected.

Figure 7:
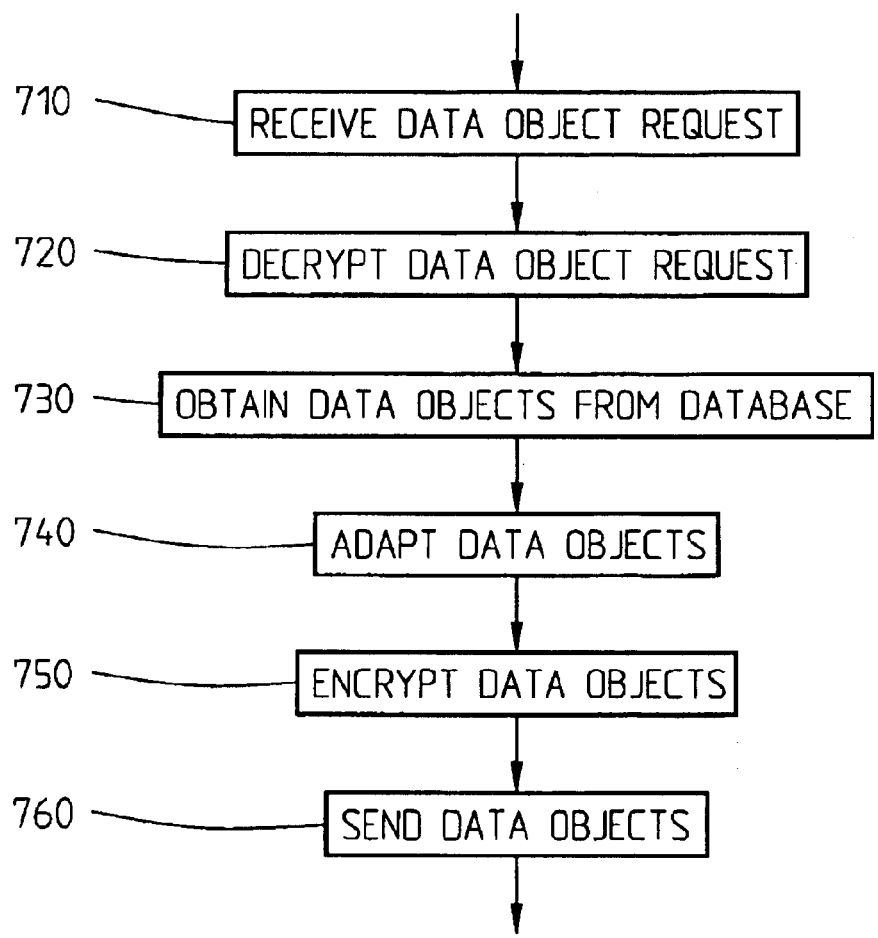
FIG. 7 shows a procedure for servicing a request for data objects at a data server.

FIG. 7 shows corresponding procedures performed in a data object server (such as data object server 130) in response to the procedures shown in FIG. 6. Namely, in step 710 the data object server receives a request for a data object. The request typically includes (in exemplary embodiments) at least an indication specifying an A- or B-number and a specification of what kind of action triggered the request. If the request is encrypted, decryption will be performed in step 720 before interpreting the content. The address indication (e.g., A- or B-number) in the request received in step 710 will be mapped to a memory address in the data object server, or to an address provided in another database maintained at some other site. The address may specify a data object, such as a phonepage. The data server retrieves the database in step 730. The request received in step 710 may also include an indication of a user device display capability; in this case, the data server may adapt the retrieved data object to the requested format. Alternatively, the database may store the data objects in different formats. In this case, the data server complies with the request by retrieving the data object having the correct format. Step 750 encrypts the request if requested or necessary. The data server sends the encrypted data object in step 760.

The above-described general technique for accessing a data object associated with a specified address may be varied in a number of different ways, depending on, for example, the communication capabilities of the user devices. For example, one or more of the steps described as being sequentially performed can be performed concurrently.

User devices, such as mobile telephones, are currently capable of handling both packet-switched and circuit-switched communication simultaneously. These devices are generally referred to as "class A" mobile telephones. Other mobile telephones have designs that allow packet-switched and circuit-switched communication in an alternative fashion. That is, these phones can alternate between packet-switched and circuit-switched communication, but cannot conduct both types of communication at the same time. These mobile telephones are referred to as "class B" mobile stations.

Figure 8:
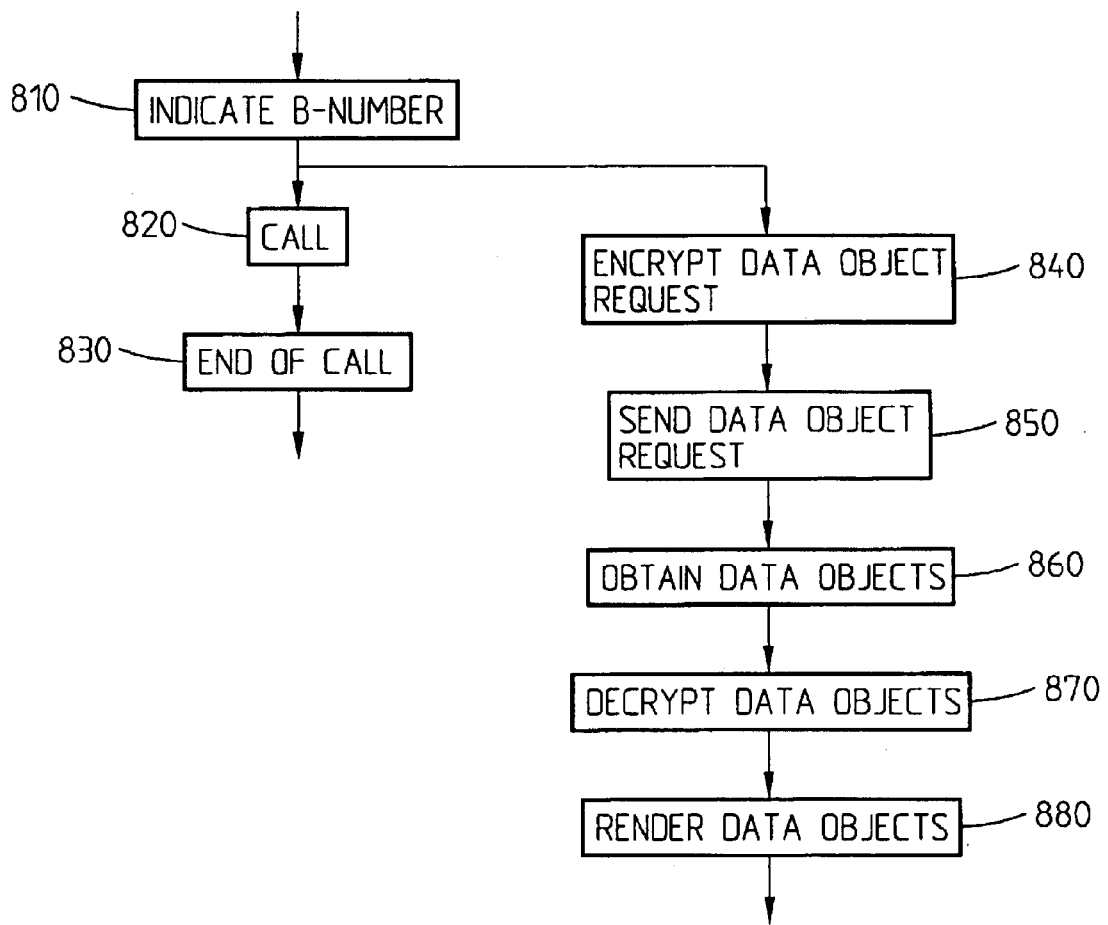
FIG. 8 shows a procedure for requesting and displaying data objects in an A-class user device.

FIG. 8 shows exemplary procedures used when a circuit-switched connection is initiated from a class A user device. In step 810, the user initiates a call session by indicating a B-number of a B-party, e.g., by pressing a digit, a button or by activating a voice recognition mechanism. The user device then starts to set up two different connections, a circuit-switched connection for a voice communication channel in step 820, and a packet-switched communication channel for retrieval of a phonepage in steps 840–880. These procedures may be performed simultaneously in a class A user device.

For the circuit-switched procedures, a voice connection with a B-party is initiated in step 820. Further, the circuit-switched communication system assigns a communication resource over which a telephone conversation can take place. The voice conversation ends (in step 830) in a conventional manner, for example by pressing a designated button on the mobile user device or hanging up a handheld part of a fixed network telephone. Ending the call also involves de-allocation of relevant communication resources within the circuit-switched part of the mobile communication network, as well as, e.g., any PSTN resources involved in the connection.

The packet-switched procedures basically follow the procedures described with reference to FIG. 6. Namely, the procedure involves sending a data object request in step 850, optionally after encryption in step 840. The user device receives the data objects in step 860, decrypts the data objects in step 870 (if necessary), and displays the data objects in step 880. At this point, the packet-switched connection also ends.

Figure 9:
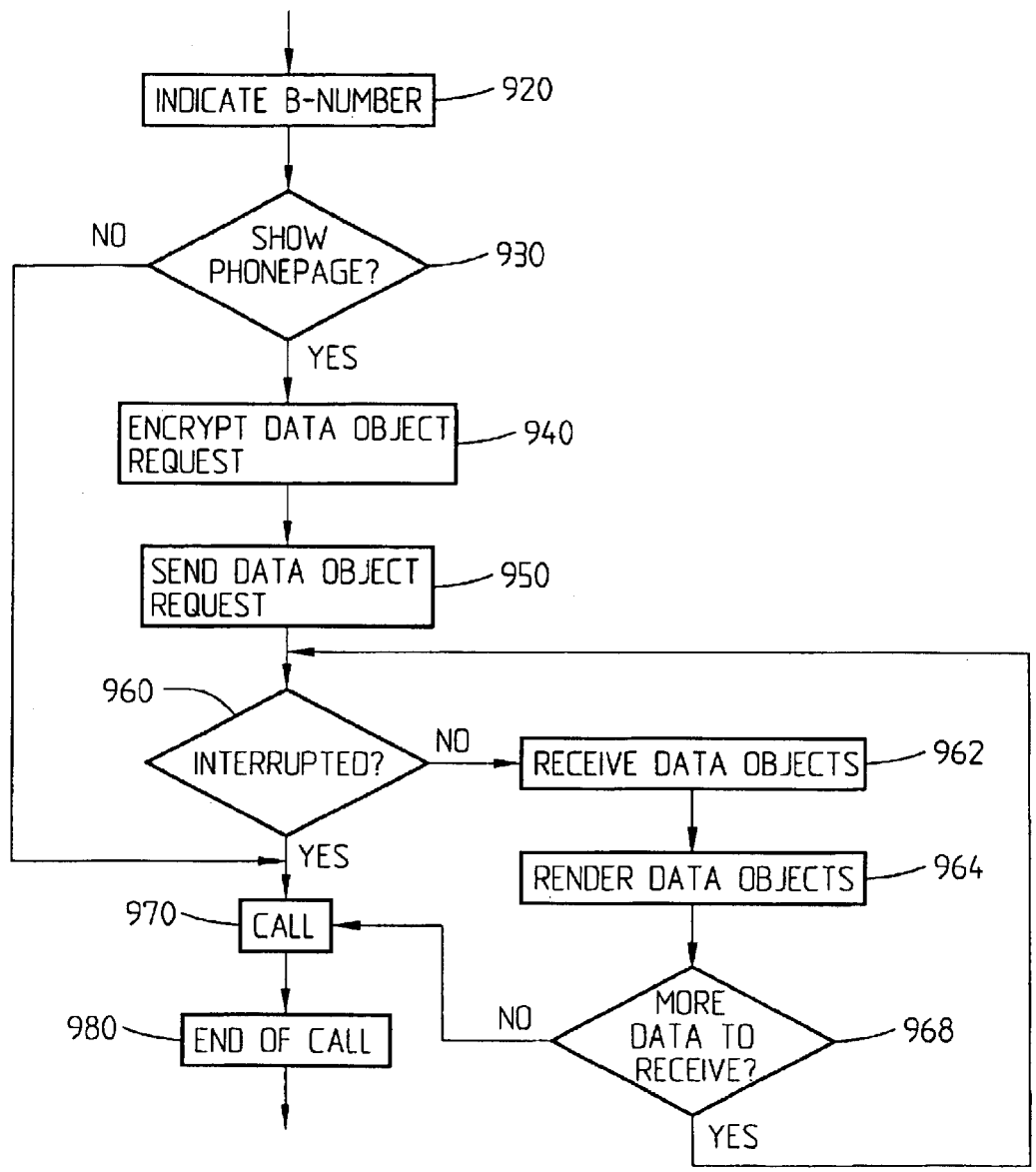
FIG. 9 shows a procedure for requesting and displaying data objects in a B-class user device.

As mentioned above, a class B type user device cannot simultaneously handle packet-switched and circuit-switched communication. FIG. 9 shows a procedure for handling voice and data communication under these constraints. In step 920 the class B type user device indicates a B-number in the manner described above with reference to FIG. 8. The procedure then advances to step 930, where the user device determines whether a phonepage is being requested or not. That is, a user may directly request the phonepage. Alternatively, the B-number that was dialed prompts such a request. For instance, in an exemplary embodiment, double clicking on a designated SEND button indicates that the phone page is to be requested. If no phone page is requested, the procedure advances to steps 970 and 980 where the circuit-switched call is conducted and then terminated.

If a phonepage is requested, then the user device encrypts a data object request (in step 940) and then sends the request (in step 950) over a packet-switched communication channel. If the packet session is not interrupted (as determined in step 960) then the user terminal receives the data object (in step 962) and displays the data objects (in step 964). And if data packet transmission is complete (as determined in step 968) then the procedure advances to steps 970 and 980 where the circuit-switched communication is then conducted.

The downloading of the packet-switched data objects may be interrupted for various reasons. For example, a user may deliberately wish to terminate the download of the data object and proceed directly to the circuit-switched communication. The download may also be automatically terminated if it is taking too long or there is an error in the transmission, or because of some other reason. In any case, if the download is interrupted (as determined in step 960), the circuit-switched call is conducted in steps 970 and 980.

In alternative embodiments, the user device may download data objects when the user device is idle (e.g., not conducting a circuit-switched communication). Further, the user device may store the phonepages of commonly accessed numbers in its memory to obviate or reduce the need to access the data server upon every telephone call.

Figure 10:
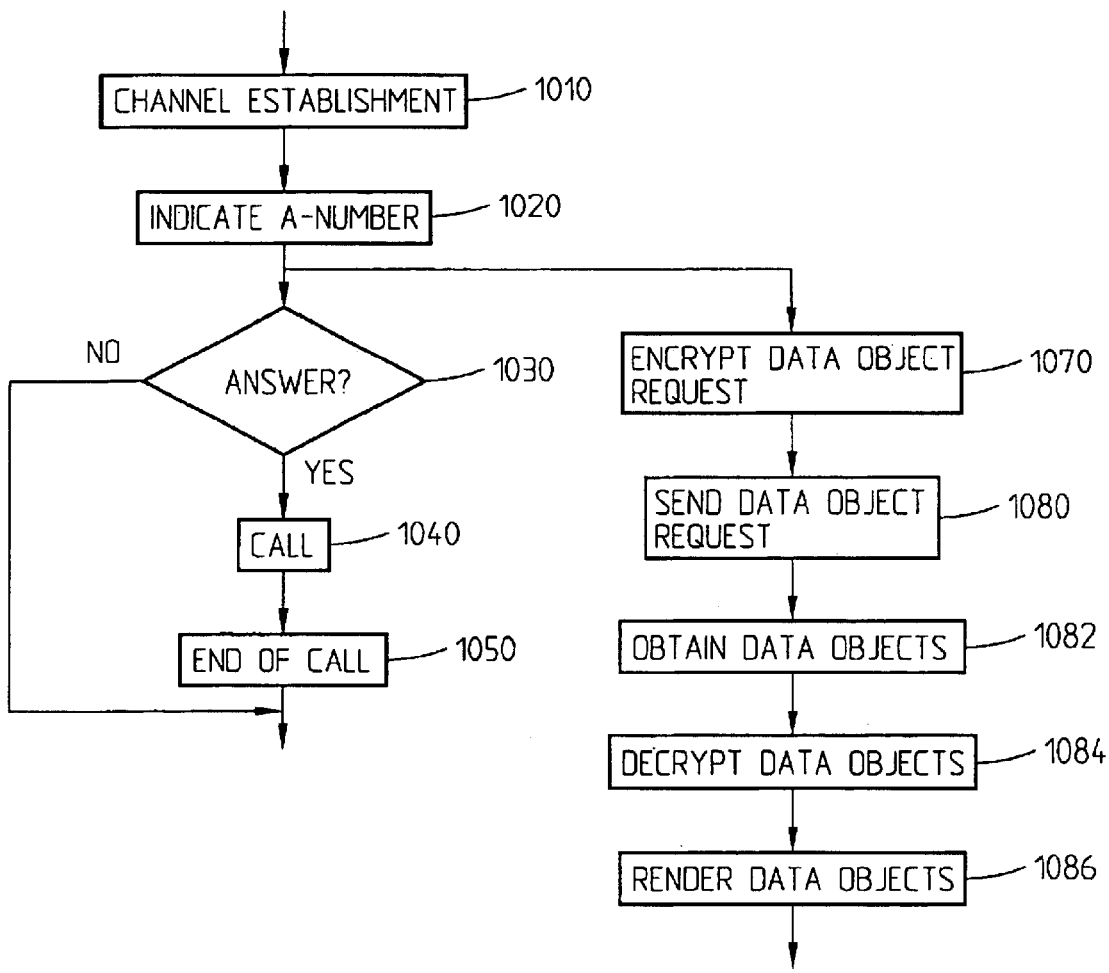
FIG. 10 shows a procedure for requesting and displaying data objects with respect to a called (B-party) user device.

So far, the retrieval of phonepages for display at an A-party user device has been addressed. A B-party may similarly display a phonepage related to a connection, preferably a phonepage associated with the A-party number. FIG. 10 shows the procedures used in a B-party user device for retrieval of A-party phonepages. In the exemplary embodiment shown in FIG. 10, the user device is an A-class device (giving it the ability to simultaneously communicate over the circuit-switched network and the public switched network).

The procedure start s when the B-party receives a call. In step 1010, the communication system allocates a communication channel for conducting the communication. In step 1020, an indication of the call originating identity, i.e., the A-party identity, and preferably an A number, is revealed to the B-party. The B-party user device then sends a data object request (in step 1080) to a data object server after optionally encrypting the request (in step 1070). The request is, when received in the server, treated in a manner similar to that outlined above for the A-party user device. Namely, the B-party user device obtains the data object (in step 1082), decrypts the data object if necessary (in step 1084) and displays the data object (in step 1086).

If the call is answered (as determined in step 1030), the voice connection may follow the same procedures (steps 1040 and 1050) as those described in relation to FIG. 8, for instance. If the call is not answered the voice communication terminates.

Further details regarding the architecture and operation of the system 10 shown in FIG. 1 can be obtained by review of the copending application Ser. No. 09/644,307 (the '307 Application), entitled "Method and Apparatus for Exchange of Information in a Communication Network," and filed on Aug. 23, 2000, which is incorporated herein by reference in its entirety. The '307 Application is based on provisional application No. 60/176,806, filed on Jan. 19, 2000, which is also incorporated herein by reference in its entirety.

3. Identification Procedures

As described above, in the GSM standard, the user device includes a Subscriber Identification Module (SIM) that stores an Internal Mobile Subscriber Ideritity (IMSI) number. When the user device makes a call it forwards its IMSI number to the circuit-switched communications system. The user device does not typically transmit its actual public telephone number. This public number is formally referred to as its Mobile Subscriber Integrated Service Digital Network number (MSISDN). The circuit-switched communication system can translate the IMSI number to the MSISDN number by reference to databases which provide mapping between these two identities.

The data server 130 may not be directly affiliated with the circuit-switched service and therefore may not have direct access to the mapping between the IMSI and MSISDN numbers. The following procedures allow the data server 130 to gain sufficient information regarding the identities of the subscribers to provide services to these users (e.g., to supply data objects, such as phonepages, to the users).

Figure 11:
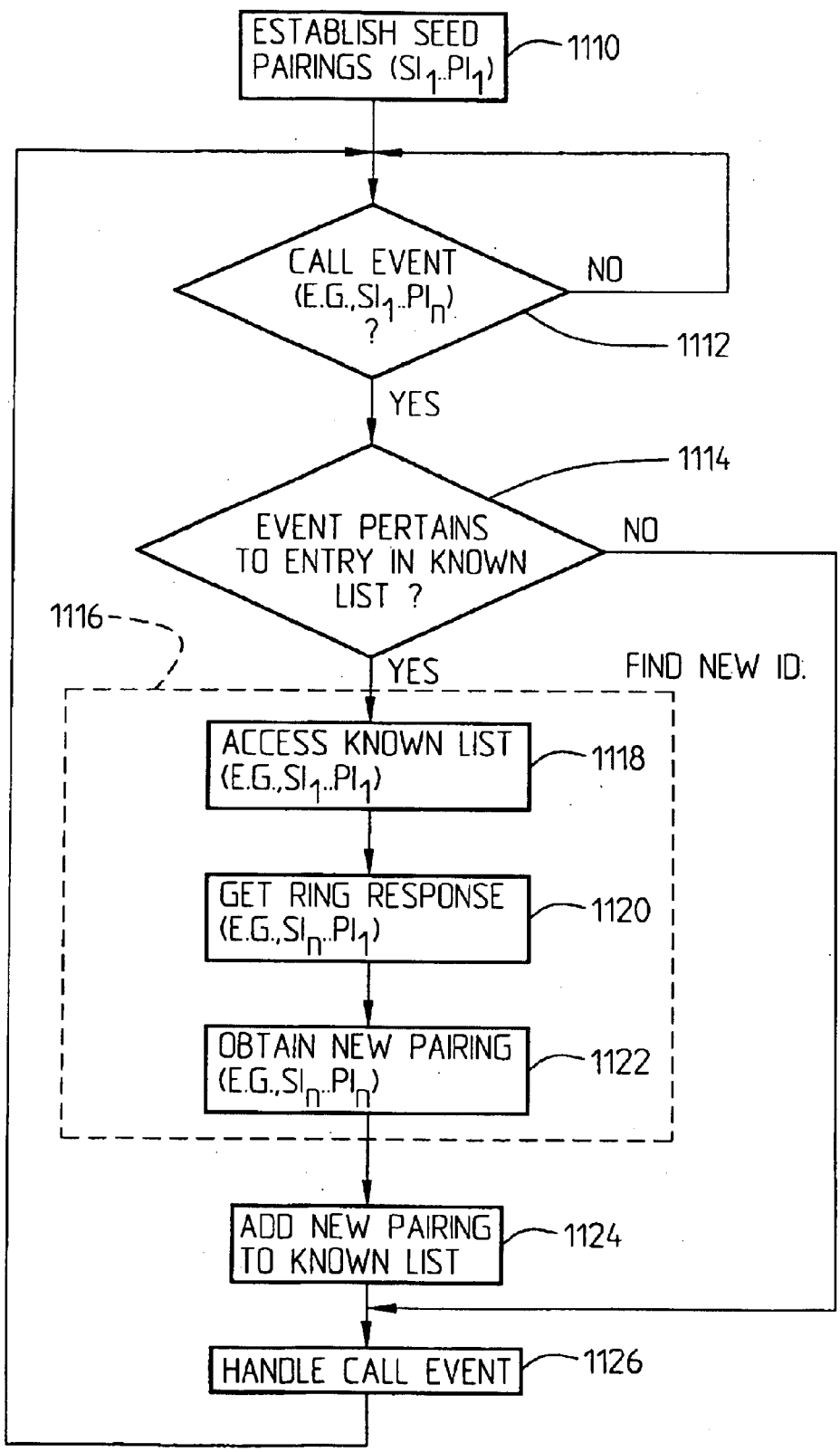
FIG. 11 shows an exemplary technique for uncovering identity pairings based on one or more known "seed" pairings.

For example, FIG. 11 shows a first procedure for uncovering public MSISD numbers. In the following discussion, secret identification numbers (such as internal GSM IMSI numbers) are denoted by "SI" (for secret identity). On the other hand, public identification numbers (such as GSM MSISDN numbers) are referred to as "PI" (for public identity). It should be recognized, however, that reference to the GSM subscriber identification scheme is illustrative. The disclosed technique finds application to other communications environments which use different identification numbers and/or protocols. Further, in the GSM context, the descriptive labels "secret" and "public" are used for convenience of explanation and do not necessary imply complete secrecy or public disclosure. In fact, the circuit-switched operators may choose to divulge secret identification numbers to the public, or the subscribers may opt to restrict the disclosure of public identification numbers from the public.

The procedure starts in step 1110, where the data server establishes a "seed" pairing which maps a known secret identity $SI_1$ to a known public identity $PI_1$. One simple way to establish a known identity is to have a circuit-switched system operator manually or automatically enter or forward the seed pairing. Alternatively, the system may enable any subscriber to directly contact the data server 130 (e.g., by dialing a special telephone number assigned to the data server and retrieving a data object page sponsored by the data server). At that time, the data server software will prompt the subscriber to directly register the seed pairing. More specifically, the data server may automatically derive or extract a subscriber's secret identification number and then prompt the subscriber to manually enter his or her public identification number (e.g., in an appropriate entry field of the page). The secret identification number can be derived or extracted on the basis of information ordinarily transmitted in the course of setting up a connection. (Such a procedure is useful, as a subscriber may be unaware of his or her secret identification number.) Other procedures for registering a seed pairing can be used. For instance, the data server may execute a menu-based prerecorded dialogue with a subscriber to collect necessary identification information. Whatever method is used, the data server then stores the seed pairing in the database of the data server, e.g., in the "known list" 242 of database 240 (with reference to FIG. 2).

The data server then waits for a call event (in step 1112). The call event may comprise any event discussed in section No. 2 above. For example, a call event may be caused by the A-party (e.g., using device 100) dialing the phone number of the B-party (e.g., using device 150) to set up a call, which may prompt the system to generate a request to the data server.

In step 1114 the data server receives the request that accompanies a call set up, and the information contained therein. In one embodiment, the A-party user device may specify its secret identification number and the public identification number of the party it is calling. The data server then determines whether this call information pertains to any entry in the "known list." For example, for illustration purposes, suppose that the list contains the known pairing $S_1$, $P_1$, corresponding to a first subscriber. Further suppose that this first subscriber makes a telephone call to another party "n." In this case, the data server may receive the secret identity of the known user (i.e., $SI_1$) and the public identity of the other terminal n (denoted by $PI_n$).

Step block 1116 then derives a new identity pair (e.g., $SI_n$, $PI_n$) from the gathered information. More specifically, in step 1118, the data server accesses the known list to determine the public identity corresponding to the received known secret identity. That is, in one example, the data server determines $PI_1$ using $SI_1$ (which was received from the user device which initiated the call) as an index. In step 1120, the data server obtains a ring response from the B-party. More specifically, in the course of setting up a call, the circuit-switched communication network pages the called party (i.e., the B-party) with a ring signal. The circuit-switched communication network may also inform the called party of the public identity of the calling party (e.g., $PI_1$). The "ring response" refers to the called party's response to the ring signal. The ring response is forwarded to the data server. It may contain the secret identification number of the called user (i.e., $SI_n$) and the public identification number of the calling A-party subscriber (i.e., $PI_1$).

In step 1122 the data server then associates the pubic identification number $PI_1$ received in the ring response with the public identification number $PI_1$ received from the database look-up (i.e., from step 1118). The gathered information now permits the data server to associate the secret identification number and public identification number of the called party (i.e., $SI_n$, $PI_n$), and thus establish another known identity. In step 1124, the data server adds the new identity pair (i.e., $SI_n$, $PI_n$) to the known list 242.

In step 1126, the system handles the call event, e.g., by conducting the call. The user devices may access and display data objects obtained from the data server in the manner outlined section No. 2. However, the data server may lack sufficient information to identify many subscribers in initial stages of its operation (e.g., when the known list contains only a few entries). In this case, the data server may be unable to retrieve and forward requested data objects until it acquires sufficient knowledge of the subscribers' identities. The user would thus conduct his or her call without the supplement of phonepages or with restricted fictionality.

The procedure of FIG. 11 repeats by waiting for a subsequent call event. The known list now contains two known entries, i.e., corresponding to the initial seed subscriber (i.e., $SI_1$, $PI_1$) and the party called in the previous call event (i.e., $SI_n$, $PI_n$). Both of these entries can be used to uncover the identities of additional users. That is, if the initial seed subscriber calls yet another user, then the seed pairing ($SI_1$, $PI_1$) can be used to uncover the identity of that other user. The same is true of the user $SI_n$, $PI_n$ If this known subscriber calls another person, then the uncovered pairing $SI_n$, $PI_n$ can be used to uncover the identity of that other person. It will therefore be appreciated that there will be a rapid "explosion" in the discovery of identities because the entries in the known list serve as seeds for uncovering yet further identities, and the known subscribers themselves serve as agents for propagating information to the data server.

In the above discussion of FIG. 11, a subscriber having a known identity places a call to a subscriber having an unknown identity, thereby uncovering the unknown identity. The basic procedure of FIG. 11 also applies to the case where a subscriber having an unknown identity places a call to a subscriber having a known identity. In this case too, the unknown identity can be uncovered.

More specifically, the subscriber having the unknown identity (e.g., $SI_n$, $PI_n$) places a call to the subscriber having a known identity (e.g., $PI_1$, $SI_1$) over the circuit switched communication system. The subscriber having the unknown identity may likewise forward a request to the data server. The data server detects this event (in step 1112) and then determines whether the event pertains to an entry in the known list (in step 1114). More specifically, the subscriber having the unknown identity may forward its secret identification number (e.g., $SI_n$) along with the public identification number of the party it is calling (e.g., $PI_1$). The data server detects a previously stored pairing pertaining to $PI_1$; thus, decision step 1114 is answered in the affirmative ("Y").

In step 1118 the data server accesses the known list and retrieves the pairing $PI_1$, $SI_1$, e.g., using the identification number $PI_1$ as an index (which was forwarded by the subscriber having an unknown identity). In step 1120 the data server gets the ring response from the called party, in this case the subscriber having a known identity ($PI_1$, $SI_1$). The ring response may contain the secret identification number of the called party (e.g., $SI_1$) and the public identification number of the calling party (e.g., $PI_n$). In step 1122, the data server now has all the information it needs to derive the identity of the unknown subscriber, namely the association between $SI_n$ and $PI_n$. This new identity is stored in the new list in step 1124.

Figure 12:
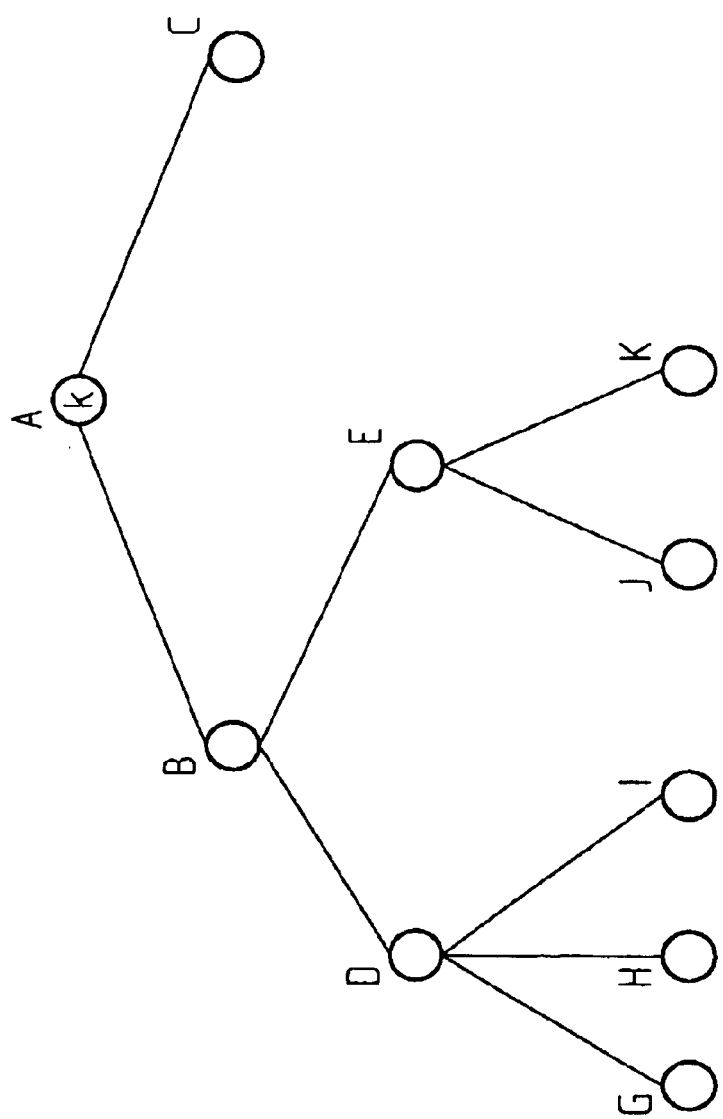
FIG. 12 graphically shows (in tree-type format) the derivation of multiple identity pairings from an initial known "seed" pairing using the technique of FIG. 11.

FIG. 12 graphically shows how multiple identities can be derived from a single seed identity. In this case, the seed identity pairing is designated by the letter "A." It additionally contains the label "k" to designate that it represents a known, i.e., trusted, mapping between secret and public identities. The seed identity pairing is used to uncover the identity pairings for subscribers B and C (this may be because the subscriber A placed telephone calls to subscribers B and C, or subscribers B and C placed a call to subscriber A). The B pairing is then used to derive the identity pairings of subscribers D and E. The D pairing is used to derive the identity pairings for subscribers G, H and I, while the E identity pairing is used to derive the identity pairings of subscribers J and K. The reader will appreciate that this pattern of derivation is exemplary. The pattern will differ if any of the identified subscribers make a different selection of calls. In a best case (where no subscriber calls the same party more than once), the data server can uncover more than 65,000 identity pairs when each subscriber makes only 16 calls. The data server can uncover more than 1,000,000 identity pairs when the subscribers each make at least 20 calls.

In a multi-country context, the operator of the data server may wish to provide a small number of known seed identity pairings in different countries. This is because the subscribers may be less likely to call subscribers from other countries, thus slowing the propagation of the known identity list.

In the FIG. 11 procedure, the user devices forwarded their secret identities (e.g., $SI_n$) to the data server. However, some subscribers may be reluctant to release any secret information over the Internet (or other public or private network). Thus, as an alternative to the procedure of FIG. 11, a user device n may first encrypt its secret identity to provide a fingerprint identity, denoted, $FI_n$. The user device then forwards its fingerprint identity $FI_n$ instead of the unencrypted secret identity $SI_n$. Any one of a variety of encryption techniques can be used to accomplish this purpose, such as DES.

Figure 13:
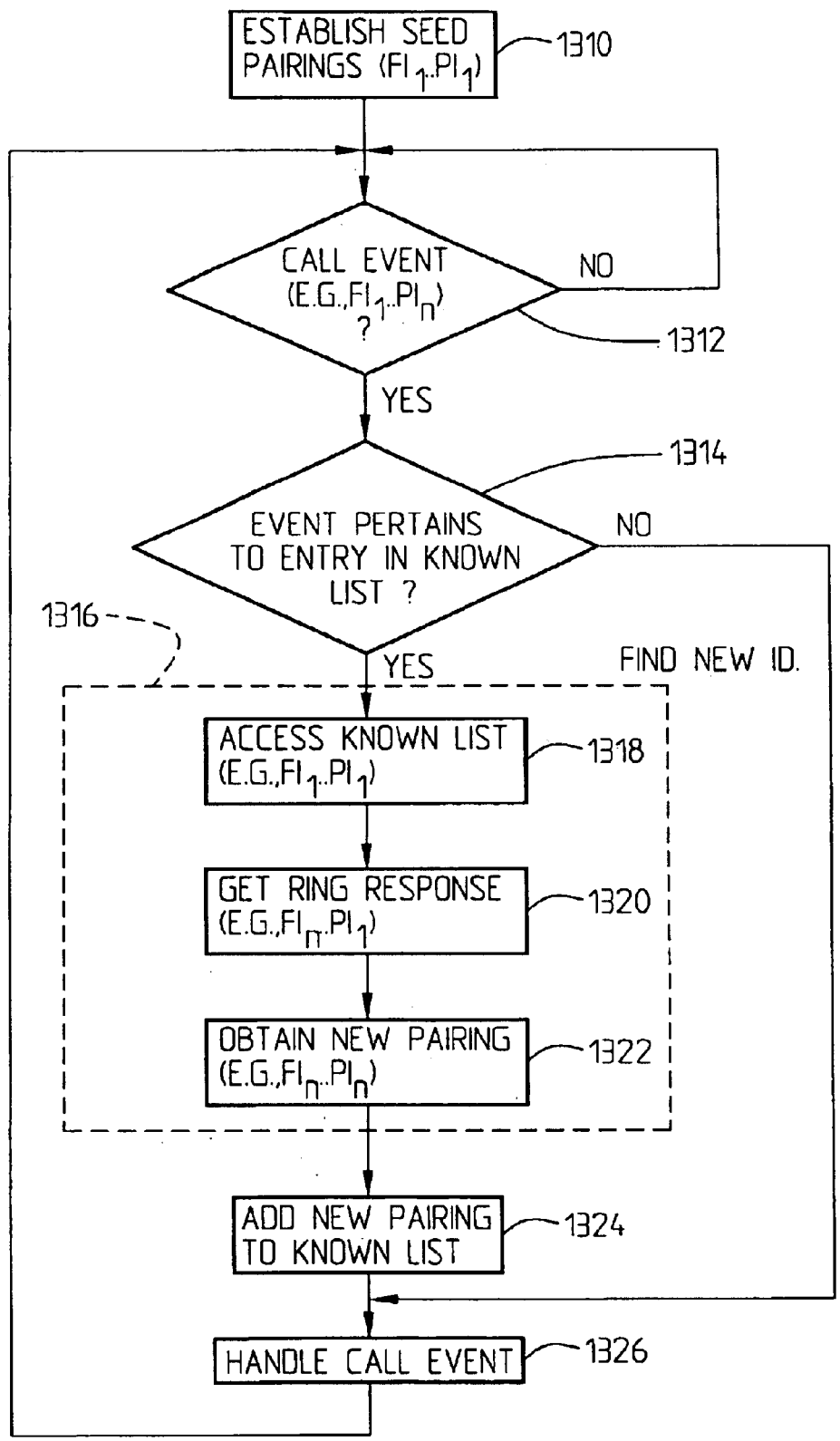
FIG. 13 shows an exemplary technique using encryption for uncovering identity pairings based on one or more known "seed pairings"

FIG. 13 shows a procedure which has the same principal steps as FIG. 11, but uses the fingerprint identification number $FI_n$ instead of the secret identification number. That is, in step 1310 the data server establishes one or more seed pairings of identities (e.g., $FI_1$, $PI_1$). The data server then awaits for a call event in step 1312. If the call event involves a known subscriber (as determined in step 1314), then the data server executes the procedure 1316 for uncovering an additional known identity. This procedure 1316 follows the same steps identified with reference to FIG. 11. Namely, the data server obtains $PI_1$ from the database using the known fingerprint identity $FI_1$ as an index (in step 1318). In step 1320, the data server receives the ring response from the called party (i.e., B-party), containing the fingerprint identity of the called party (i.e., $FI_n$) and the public identification number of the calling party (i.e., $PI_1$). In step 1322, the data server uses the gathered information to establish a known pairing between $FI_n$ and $PI_n$. In step 1324, the data server stores the new known pairing in the known list of the database.

Further, the procedure shown in FIG. 13 can also be used when a subscriber having an unknown identity places a call to a subscriber having a known identity, thereby uncovering the unknown identity. The basic steps in this procedure were outlined above in connection with FIG. 11.

Figure 14:
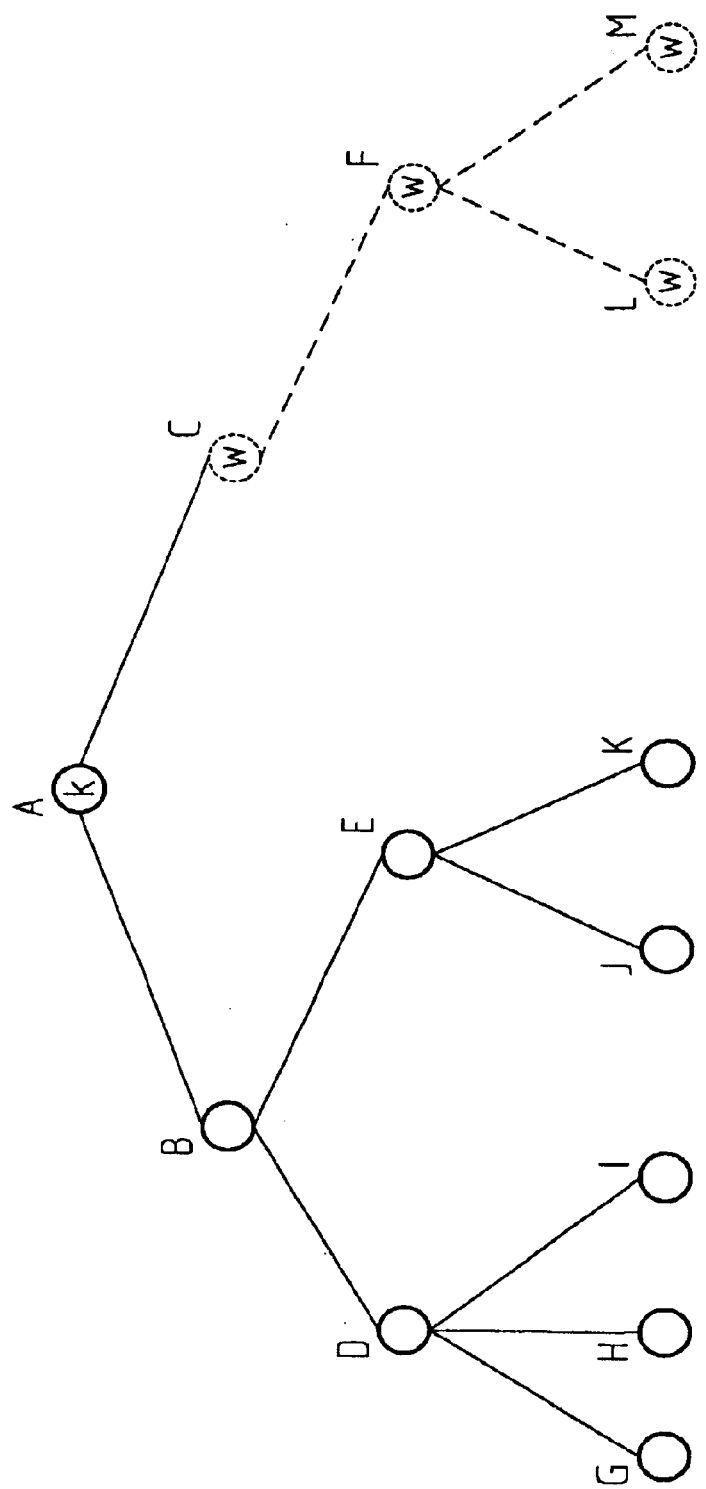
FIG. 14 graphically shows (in tree-type format) the derivation of multiple identity pairings from an initial known "seed" pairing, particularly illustrating the effects of the erroneous mapping of identities.

The known list 242 may contain inaccurate entries. For instance, the operator of the switched communication system may change a numbering plan in a region (e.g., to allow more subscribers). In this case, a secret identity may remain valid, but it is now associated with another public identity within the circuit-switched communication system. This invalidates the entry in the known list of the data server, which contains the previous mapping between the secret and public identities. Moreover, the data server may unintentionally use incorrect entries to derive additional known identities. This may propagate the errors in the known list. FIG. 14 illustrates this concept. In this exemplary case, the circuit-switched system may have executed a renumbering plan which invalidated the derived identity pairing for subscriber C. This is graphically indicated by the symbol "w" associated with subscriber C, designating that the list contains the "wrong" pairing. Further, the data server may have subsequently used the incorrect pairing for subscriber C to derive the identity pairings for subscribers F, L and M. The pairings for subscribers F, L and M may therefore also be wrong, as they may incorporate the incorrect mapping used in subscriber C's pairing.

Similar problems are encountered when a subscriber is issued a new SIM card containing a new secret identity. In this case, the public identity of the subscriber remains the same, but the secret identity may have changed. This invalidates the identity pairing in the known list of the data server (which is based on a previous association of secret and public identity pairings).

Figure 15:
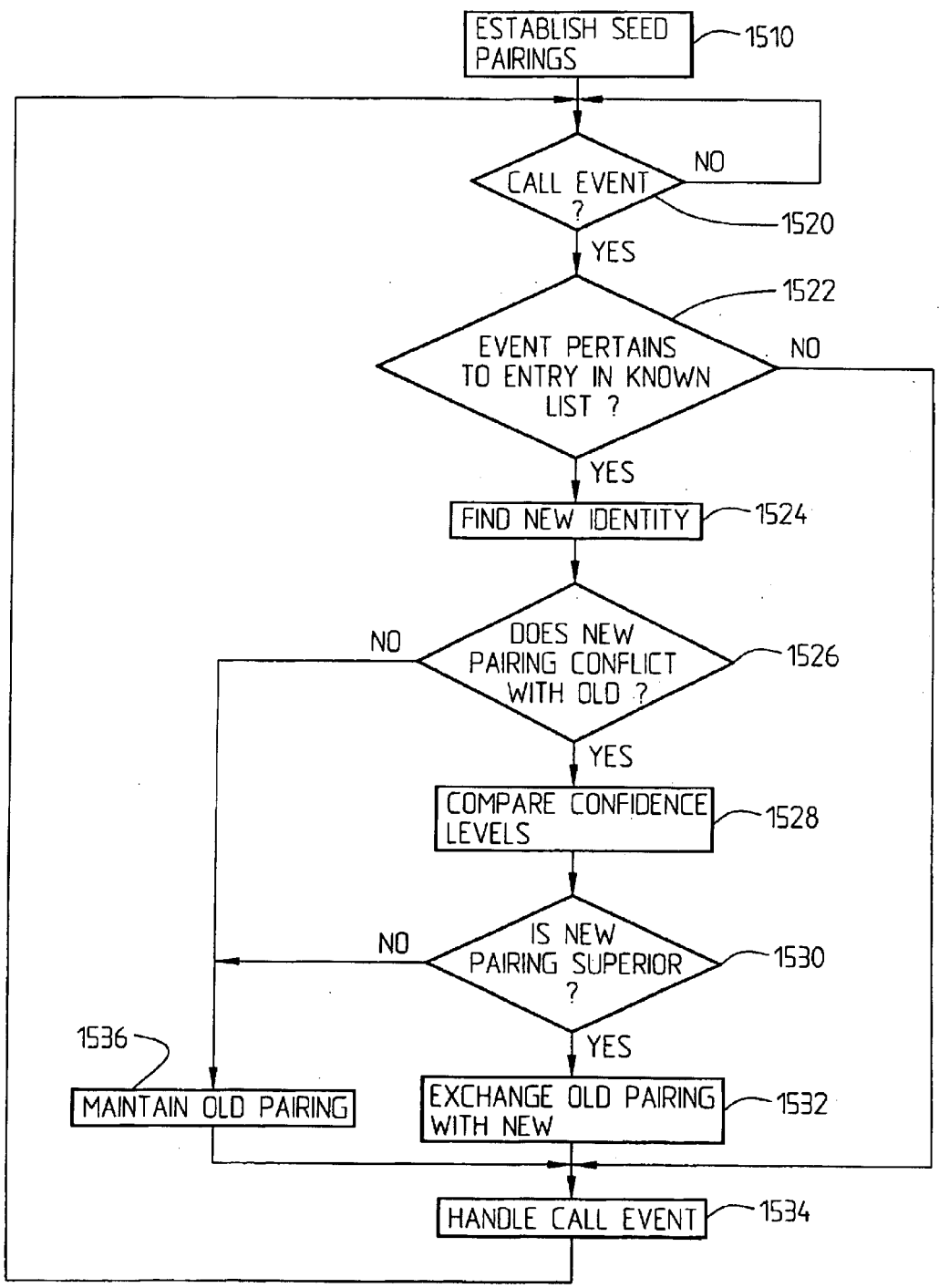
FIG. 15 shows an exemplary technique for uncovering identity pairings based on one or more known "seed" pairings, including updating of erroneous identity mappings.

FIG. 15 presents an exemplary technique for reducing the deleterious impact of the above-described problems. The procedure starts in the same manner as FIGS. 11 and 13, e.g., by establishing seed identities (step 1510), determining if a call event has occurred (in step 1520), determining whether the call event pertains to an entry in the known list (step 1522), and if so, finding a new identity pairing based on the known pairings in the list (step 1524). Step 1524 may specifically include the substeps identified in FIGS. 11 or 13 (that is, for example, steps 1118–1122 in FIG. 11 or steps 1318–1322 in FIG. 13). Thus, as with the FIG. 11 procedure, the procedure in FIG. 15 can uncover the pairing $SI_n$, $PI_n$ (or $FI_n$, $PI_n$) based on the initial seed pairing of $SI_1$, $PI_1$ (or $FI_1$, $PI_1$)

In the procedure of FIG. 15, however, the derived identity ($SI_n$, $PI_n$ or $FI_n$, $PI_n$) may not be completely unknown, but may, in fact, have been previously derived. Thus, the database may already store an identity pairing (i.e., $SI_n$, $PI_n$ or $FI_n$, $PI_n$ that was derived in a previous iteration of the procedure. For example, another known A-party (from the known list) may have previously placed a call to the currently contacted B-party, and the data server may have previously derived the identity pairing ($SI_n$, $PI_n$ or $FI_n$, $PI_n$) of the B-party based on that previous known A-party.

Accordingly, in step 1526, the data server determines whether the newly uncovered identity pairing conflicts with a previously stored identity pairing. This may be the case where the previously stored identity pairing is now inaccurate, whereas the currently derived identity pairing is accurate.

The data server assigns confidence levels to the old and new identity pairings to assess their relative accuracy. The data server can use a variety of parameters to define a confidence level. For instance, one confidence parameter pertains to the "distance" from a trusted identity pairing to the identity pairing in question. The "distance" corresponds to the number of derivations that were made, starting with a trusted identity pairing, to derive the final identity pairing in question. For instance, an identity pairing which was determined in a long chain of derivations starting from a trusted identity pairing may have a lower confidence level than an identity pairing that was directly determined from a trusted identity pairing (e.g., without an intervening chain of derivations).

Other indicia of confidence may be used instead of the distance measure, or as a supplement to the distance measure. For instance, another possible confidence parameter pertains to the "age" of the pairing, indicating the length of time since it was first uncovered. That is, the data server may be configured to give priority to more recent pairings based on the assumption that "old" pairings are more likely to be inaccurate than "new" pairings (having had more time to be corrupted by subsequent events). Other confidence parameters may attach significance to the characteristics of the subscriber (or subscribers) used to derive the new identity (under the assumption that some "seed" subscribers may be more reliable than others). Other confidence parameters may reflect errors or failures experienced in the past when using a pairing in the known list.

The choice of parameters may depend on the communications environment of a specific application. Whatever parameters are used, the database may be configured to store the parameters along with their associated pairings so that they can be accessed and evaluated when performing the procedure defined by FIG. 15.

Step 1528 compares the confidence level of the current identity pairing with the confidence level of the previously derived identity pairing. Step 1530 determines whether the new identity pairing is superior to the previous identity pairing based on their respective confidence levels. If so, the data server replaces the previous identity pairing with the new identity pairing (in step 1532). If the new identity pairing does not have a higher confidence level, the data server maintains the previous pairing in the database (in step 1536). The procedure terminates by the handling of the call in step 1534.

Figure 16:
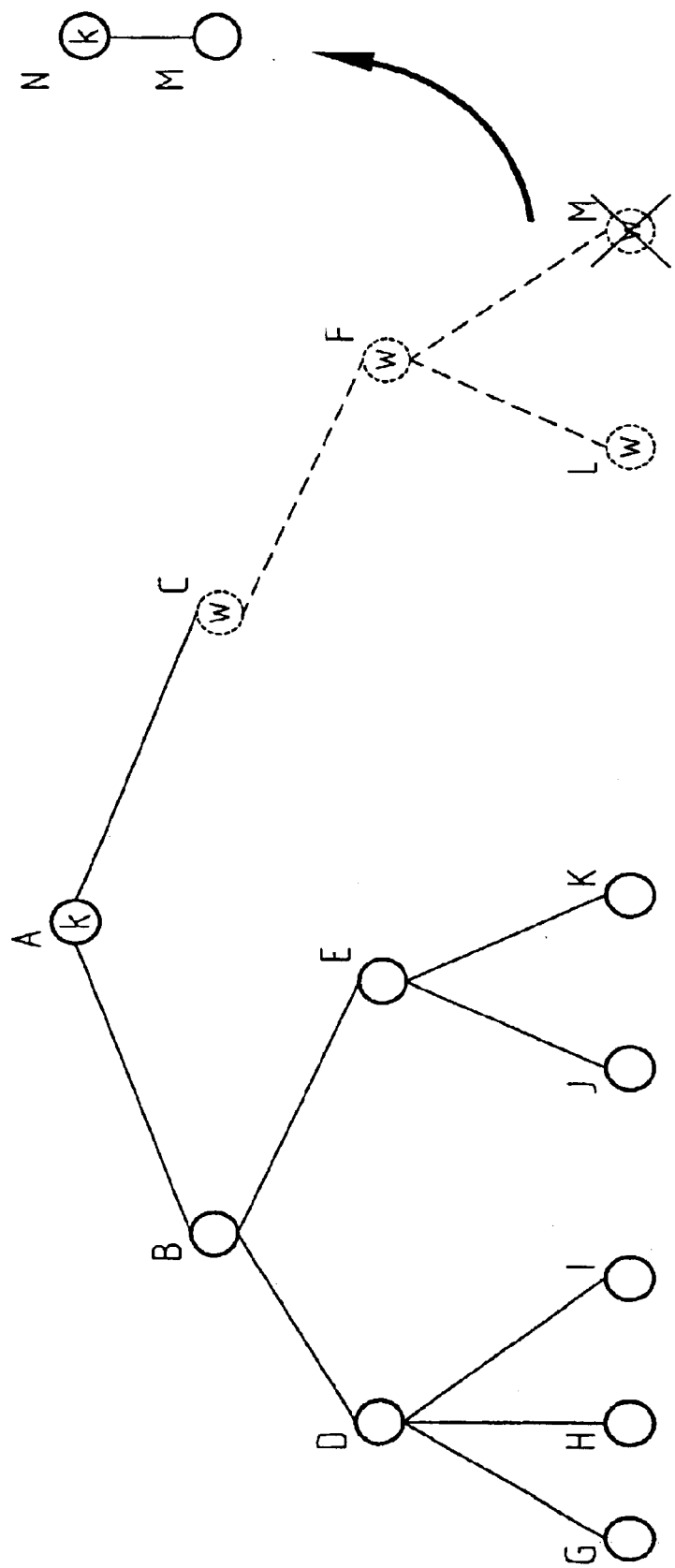
FIG. 16 graphically shows (in tree-type format) the derivation of multiple identity pairings from an initial known "seed" pairing, particularly illustrating the correction of erroneous identity mappings using the technique of FIG. 16.

FIG. 16 graphically shows how the procedure of FIG. 15 can be used to modify the identity pairings in the database. As in the FIG. 14 depiction, the identity pairing for subscriber C has become inaccurate, thus infecting the identity pairings of subscribers F, L and M, which are derived from the identity pairing for subscriber C. In this situation, presume that another subscriber N having a known and trusted identity pairing subsequently places a call directly to subscriber M, thus providing a new identity pairing for subscriber M. In this case, the new identity pairing would conflict with the previously derived identity pairing. This is because the previously derived identity pairing incorporates the erroneous mapping for subscriber C, whereas the new identity pairing does not. In accordance with the procedure of FIG. 15, the data server assigns confidence levels to the two different identity pairings and selects the pairing with the highest confidence level. Presume, for instance, that the distance parameter is used to assess the confidence level. In this case, the newly derived identity pairing has a shorter distance to a trusted identity pairing compared to the previously derived identity pairing. Accordingly, the data server will store the newly derived identity pairing in the known list in place of the previously derived identity pairing.

The above discussion of FIGS. 15 and 16 was based on an exemplary scenario in which a subscriber with a trusted known identity (the A-party) contacts a subscriber with an inaccurate identity (the B-party), thereby correcting the inaccurate identity. That is, in the illustration of FIG. 16, subscriber N (the A-party) contacts subscriber M (the B-party) to correct subscriber M's identity pairing. In the more general situation, there is no expectation in the procedure that the B-party is the target of corrective action. In fact, the B-party's identity may be superior to the A-party's identity. In this case, the procedure would replace the A-party's identity pairing with a pairing based on the B-party's identity pairing. For instance, in the case of FIG. 16, the outcome of the confidence comparisons may have resulted (depending on the selection of confidence parameters) in the data server changing the identity pairing of subscriber N such that it is derived from the identity pairing of subscriber M.

Thus, step 1524 in FIG. 15 may actually derive a new identity pairing for the B-party (as if it were unknown) based on the identity pairing of the A-party, and may also derive a new identity pairing for the A-party (as if were unknown) based on the identity pairing of the B-party. Steps 1528 and 1530 entail making comparisons of old and new identities for both the A-party and B-party. Steps 1536 and 1532 entail potentially making changes for either the A-party or B-party. In other words, the procedure in FIG. 15 may first treat the A-party as a potential superior party, which may "impose" its identity in deriving a new identity for party B. The procedure in FIG. 15 may also treat the A-party as a potential inferior party, which must then itself submit to a change in identity. This algorithm thus has the potential of quickly affecting corrective action in the known list. Other mechanisms for correcting identity pairings are possible. For instance, the database may maintain a record which traces the chain of identity pairing derivations. That is, the database may maintain information describing the links shown FIG. 16. Upon discovery of an inaccurate identity pairing, the data server could then invalidate all identity pairings that were derived based on this inaccurate identity pairing. If sufficient information is available, the data server may also attempt to correct erroneously derived identity pairings.

The above described techniques offer a number of benefits. For instance, the techniques allow a data server to uncover sufficient information regarding the identities of circuit-switched communication system subscribers to provide these subscribers with various services. Moreover, the data server performs this task without having to "break into" (i.e., directly access) the internal data records maintained by the circuit-switched communication network.

Further, the technique of encrypting the user's secret identity prior to transmission to the data server helps to protect the privacy of the user.

The method and system described above can be modified in various ways. For instance, the seed pairing can be established in an automatic manner (without requiring that the subscriber manually specify his or her identification numbers). For instance, in an alternative embodiment, the data server may log call event information in its database. Namely, for instance, when an A-party places a call, the data server may record its secret identification number and the public identification number of the B-party it is calling. Also, when a B-party receives a call and forwards a response to the data server, the data server may record its secret identification number and the public identification number of the calling A-party. Further, the data server may be configured to store a timestamp which indicates when each of the events occurred.

In the above-described variation, the data server may establish the association between a particular secret identification number $SI_x$ and public identification number ($PI_x$) for a subscriber "x" by statistical inference based on the entries in the database. More specifically, presume that there were plural call events (i.e., n call events) pertaining to subscriber "x" (e.g., constituting calls placed by subscriber "x" or calls placed to subscriber "x"). For each of these events, the data server should have logged the secret identification number and the public identification number for subscriber "x" within a time period T. The time period T may empirically reflect an interval of time which typically (e.g., on average) separates the logging of a secret identification number from the logging of a public identification number. The association between $SI_x$ and $PI_x$ can therefore be derived by examining the entries in the database for each of the call events within the prescribed time period T. That is, the data server may examine the events that occurred within +T of the secret identification number $SI_x$ and within −T of the secret identification number $SI_x$.

The association between $SI_x$ and $PI_x$ can be computed by counting the number of times that $SI_x$ is paired with $PI_x$ for the n events. If there is a true association between $SI_x$ and $PI_x$, then the database should indicate several (e.g., n) pairings for the n events. (Of course, if a pairing between $SI_x$ and some other public identification number is more prevalent, then this pairing may indicate the true association.) This association may also be computed using more advanced correlation techniques, such as least squares, etc. The entries in the database may also be weighted depending on their proximity to an expected separation between secret and public identification numbers. That is, the data server may decrease the relevancy of pairings that are located relatively far apart from each other (but still within the interval T). Whatever association/correlation technique is used, the confidence level of this inferred identity pairing will obviously increase if the number of events n that the data server examines is increased.

The above-described inference calculations can also be used to provide yet another confidence parameter for use in the procedure of FIG. 15. Namely, the data server can examine a plurality of call events pertaining to a subscriber to assess the accuracy of its identity pairing. The above-described inference calculations can also be used to automatically correct identity pairings that are assessed to be inaccurate. These corrections can be performed at any time (e.g., not necessarily during the call event), because they draw from the stored call event data.

In yet another alternative embodiment, the above-described inference calculation can be used to derive multiple unknown identities (that is, additional unknown identifies beyond the initial seed identity). For instance, all of the identities can be derived by inference. The desirability of this solution may diminish as the number of subscribers in the system increases.

In the above-described encryption technique (e.g., with reference to FIG. 13), the data server stores the encrypted secret identification number (i.e., $FI_n$) in the known list without decrypting it. In this way, the data sever cannot uncover the secret identification number of a subscribers. In an alternative technique, the data server can decrypt the encrypted secret identification number and store the decrypted identification number (i.e, $SI_n$) in the known list (that is, providing that the data server is authorized to obtain and use the encryption key). In this way, the circuit-switched system can at least limit the disclosure of secret identification numbers to authorized data servers.

Further, additional measures can be taken to protect the security of transmission within the system. For instance, the user device may include security logic for adding security data to the encrypted secret identification number. The security data changes for each transmission session (e.g., each call). The data server also includes security logic that separately computes the security data. In operation, the data server's security logic strips the received security data from the encrypted secret identification number and compares it to its separately-computed security data. If the separately-computed security data is the same as the received security data, then the data server may process the call in its typical manner (e.g., by accessing and downloading a data object and/or by determining the identity of a subscriber). If the separately-computed security data differs from the received security data, then there has been a potential security violation. In this case, the data server may terminate the connection or take some other appropriate security-related action. This technique therefore serves to authenticate the identity of a user device. For instance, it provides a way of detecting whether an unauthorized party is wrongfully using an encryption key of a user device, and thus attempting to impersonate the user device. The use of the security data also provides a technique for preventing an unauthorized party from tracking the transactions (e.g., calls) made by a subscriber (because it is not easy for the unauthorized user to uncover the security data which changes for each transaction).

In one specific example of the above-described technique, the user device uses a sequential counter in each communication session (e.g., each call) to generate a count value, which constitutes the security data. The data server maintains a similarly-configured sequential counter which is synchronized to generate the same count value for the session. More specifically, the user device increases the counter by one preceding each communication session. After a session is established, the counter in the data server is also incremented by one. Thus, the user device counter and the data server counter should track each other. Also, since the counter is first increased in the user device, any signaling failures can be recovered by performing a retry and by also increasing the counter value in the data server.

In the above example, the user device appends the count value to the encrypted secret identification number and forwards it to the data server. Upon receipt, the data server strips the count value from the encrypted secret identification number and compares the received count value with its own separately-computed count value. Lack of agreement potentially indicates that an unauthorized transmission has occurred. Namely, if the counter in the user device is found to be different from the counter value in the data sever, the user device may have been impersonated. That is, disagreement in the count values may indicate that someone has wrongly appropriated the encryption key of the user device. The extent to which these values differ may indicate the degree of wrongful activity by the impersonating party (e.g., the number of wrongful call attempts by the impersonating party).

It should be noted that other nodes in the system can be used to perform the above-described authentication processing (e.g., besides the data server node). Further, in the above-described embodiments, the security data is appended to an encrypted secret identification number, to thereby provide an additional level of security. However, this technique could also be used without encrypting the secret identification number (e.g., by appending the security data to the unencrypted secret identification number).

Further, other techniques for generating security data can be used. For instance, a timer can generate a time value as the security data (e.g., in the case where the user device and data server are configured to generate the same time values for a transaction). Also, a random number generator can generate a random value as the security data (e.g., in the case where the user device and data server are configured to generate the same random values for a transaction.)

Generally, while the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A method for deriving the identity of a user, comprising the steps of:
    establishing a first known identity associated with a first user;
    storing the first known identity in a database;
    receiving information regarding a communication between the first user and a second user;
    deriving a second known identity associated with the second user based on the first known identity and the received information regarding the communication with the second user; and
    updating the database to store the second known identity in the database;
    wherein the first known identity comprises a secret identification number for the first user ($SI_1$) mapped with a public identification number for the first user ($PI_1$); and
    wherein the second known identity comprises a secret identification number for the second user ($SI_2$) mapped with a public identification number for the second user ($PI_2$).

2. The method according to claim 1, where the secret identification number ($SI_1$ or $SI_2$) comprises an IMSI number and the public identification number ($PI_1$ or $PI_2$) comprises a MSISDN number.

3. The method according to claim 1, wherein the information regarding the communication includes: a) in the case where the first user initiates a call, the secret identification number ($SI_1$) corresponding to the first user and a public identification number ($PI_2$) corresponding to the second user; or b) in the case where the second user initiates a call, the secret identification number ($SI_2$) corresponding to the second user and a public identification number ($PI_1$) corresponding to the first user.

4. The method according to claim 3, wherein the secret identification number ($SI_1$ or $SI_2$) is encrypted prior to transmission to form an encrypted secret identification number ($FI_1$ or $FI_2$).

5. The method according to claim 3, wherein the step of deriving includes:
    accessing the database to determine the identification numbers ($SI_1$, $PI_1$) of the first user based on the received information;
    in the case where the first user initiates the call, receiving a message from the second user, the message including an indication of the secret identification number ($SI_2$) of the second user and the public identification number ($PI_1$) of the first user, or, in the case where the second user initiates the call, receiving a message from the first user, the message including an indication of the secret identification number ($SI_1$) of the first user and the public identification number ($PI_2$) of the second user; and
    using the information obtained in the accessing and receiving substeps to derive a known mapping between the secret identification number of the second user ($SI_2$) and the public identification number of the second user ($PI_2$).

6. The method according to claim 1, further comprising the steps of:
    determining the identity of the second user using another known identity to form an updated identity;
    determining whether the updated identity has a higher confidence level than a previously stored identity for the second user; and
    storing the updated identity in the database if it has a higher confidence level than the previously stored identity.

7. The method according to claim 6, wherein the confidence level is at least one of:
    a distance measure which indicates the number of derivations from a trusted identity to a final derived identity; or
    an age measure which indicates the lapse of time since an identity was uncovered.

8. The method according to claim 1, wherein the establishing, storing, receiving, deriving and updating steps are performed in a data server in a first communication network, and wherein the identities pertain to users of a second communication network.

9. The method according to claim 8, wherein the first data network is a packet-switched communication network, and the second network is a circuit-switched communication network.

10. A system for deriving th e identity of a user, comprising:
    at least first and second user devices operated by first and second users, respectively;
    a data server for providing at least one service to at least one of the first and second users;
    a first data network connected to the data server; and
    a second communications network providing communication services to the first and second users,
    wherein the data server includes:
        a database; and
        a processing unit, wherein said processing unit includes:
            establishing logic for establishing a first known identity associated with the first user;

storing logic for storing the first known identity in the database;

receiving logic for receiving information regarding a communication between the first user and the second user;

deriving logic for deriving a second known identity associated with the second user based on the first known identity and the received information regarding the communication with the second user; and updating logic for updating the database to store the second known identity in the database;

wherein the first known identity comprises a secret identification number for the first user ($SI_1$) mapped with a public identification number for the first user ($PI_1$); and wherein the second known identity comprises a secret identification number for the second user ($SI_2$) mapped with a public identification number for the second user ($PI_2$).

11. The system according to claim 10, where the secret identification number ($SI_1$ or $SI_2$) comprises an IMSI number and the public identification number ($PI_1$ or $PI_2$) comprises a MSISDN number.

12. The system according to claim 10, wherein the information regarding the communication includes: a) in the case where the first user initiates a call, the secret identification number ($SI_1$) corresponding to the first user and a public identification number ($PI_2$) corresponding to the second user; or b) in the case where the second user initiates a call, the secret identification number ($SI_2$) corresponding to the second user and a public identification number ($PI_1$) corresponding to the first user.

13. The system according to claim 12, wherein the secret identification number ($SI_1$ or $SI_2$) is encrypted prior to transmission to form an encrypted secret identification number ($FI_1$ or $FI_2$).

14. The system according to claim 12, wherein the logic for deriving includes:

accessing logic for accessing the database to determine the identification numbers ($SI_1$, $PI_1$) of the first user based on the received information;

receiving logic for receiving, in the case where the first user initiates a call, a message from the second user, the message including an indication of the secret identification number ($SI_2$) of the second user and the public identification number ($PI_1$) of the first user or, in the case where the second user initiates the call, receiving a message from the first user, the message including an indication of the secret identification number ($SI_1$) of the first user and the public identification number ($PI_2$) of the second user; and mapping logic for using the information obtained by the accessing and message receiving logic to derive a known mapping between the secret identification number of the second user ($SI_2$) and the public identification number of the second user ($PI_2$).

15. The system according to claim 10, wherein the processing unit further includes:

determining logic for determining the identity of the second user using another known identity to form an updated identity;

determining logic for determining whether the updated identity has a higher confidence level than a previously stored identity; and storing logic for storing the updated identity in the database if it has a higher confidence level than the previously stored identity.

16. The system according to claim 15, wherein the confidence level is at least one of:

a distance measure which indicates the number of derivations from a trusted identity and a final derived identity; or an age measure which indicates the lapse of time since an identity was uncovered.

17. The system according to claim 10, wherein the identities pertain to users of the second communication network.

18. The system according to claim 17, wherein the first data network is a packet-switched communication network, and the second network is a circuit-switched communication network.

19. A data server for deriving the identity of a user, comprising:

a database; and a processing unit, wherein said processing unit includes:

establishing logic for establishing a first known identity associated with a first user;

storing logic for storing the first known identity in the database;

receiving logic for receiving information regarding a communication between the first user and a second user;

deriving logic for deriving a second known identity associated with the second user based on the first known identity and the received information regarding the communication with the second user; and updating logic for updating the database to store the second known identity in the database;

wherein the first known identity comprises a secret identification number for the first user ($SI_1$) mapped with a public identification number for the first user ($P_1$); and wherein the second known identity comprises a secret identification number for the second user ($SI_2$) mapped with a public identification number for the second user ($PI_2$).

20. The data server according to claim 19, wherein the information regarding a communication between the first user and a second user comprises a message from the first user that includes (a) only one of the first user's secret identification number and the first user's public identification number, and (b) only one of the second user's secret identification number and the second user's public identification number, such that the message does not include the full identity ($SI_1$, $PI_1$) of the first user and the message does not include the full identity ($SI_2$, $PI_2$) of the second user.

21. The data server according to claim 19, wherein prior to deriving the second known identity, the database includes no previously-stored known identity for the second user.

22. The data server according to claim 19, wherein the updating logic is further adapted for determining that the derived second known identity pair for the second user conflicts with a previously stored identity pair for the second user, and selecting between the conflicting identity pairs.

23. The data server according to claim 19, wherein the database includes a previously-stored first known identity for the first user and a previously-stored second known identity for the second user, and further wherein the processing unit is adapted to (a) use the previously-stored first known identity to derive an updated second known identity, and (b) use the previously-stored second known identity to derive an updated first known identity, and (c) select between the updated first identity and the updated second identity for updating the database.

24. The data server according to claim 19, wherein the receiving logic receives information based on a first call event, and the deriving logic derives the second known identify based on a second call event, the first and second call events being associated with the same call undertaken between the first and second users.

25. The data server according to claim 19, wherein the processing unit is adapted to use the derived second known identity in connection with a communication between the second user and a third user, thereby to derive and update the database with a third known identity for a third user based on the previously-derived second known identity of the second user.

26. The method according to claim 1, wherein the information regarding a communication between the first user and a second user comprises a message from the first user that includes (a) only one of the first user's secret identification number and the first user's public identification number, and (b) only one of the second user's secret identification number and the second user's public identification number, such that the message does not include the full identity ($SI_1$, $PI_1$) of the first user and the message does not include the full identity ($SI_2$, $PI_2$) of the second user.

27. The method according to claim 1, wherein prior to the step of deriving the second known identity, the database includes no previously-stored known identity for the second user.

28. The method according to claim 1, further comprising the step of determining that the derived second known identity pair for the second user conflicts with a previously stored identity pair for the second user, and further comprising the step of selecting between the conflicting identity pairs.

29. The method according to claim 1, wherein prior to the receiving step, the database includes a previously-stored first known identity for the first user and a previously-stored second known identity for the second user, and further wherein the deriving step is performed (a) using the previously-stored first known identity to derive an updated second known identity, and (b) using the previously-stored second known identity to derive an updated first known identity, and further comprising the step of selecting between the updated first identity and the updated second identity for updating the database.

30. (New) The method according to claim 1, wherein the step of receiving is based on a first call event and the step of deriving is based on a second call event, the first and second call events being associated with the same call undertaken between the first and second users.

31. The method according to claim 1, wherein the steps are repeated using the derived second known identity in connection with a communication between the second user and a third user, thereby to derive and update the database with a third known identity for a third user based on the previously-derived second known identity of the second user.

* * * * *